US012563565B2

(12) United States Patent
Li

(10) Patent No.: US 12,563,565 B2
(45) Date of Patent: Feb. 24, 2026

(54) RESOURCE ALLOCATION METHOD, TERMINAL AND STORAGE MEDIUM

(71) Applicant: TCL COMMUNICATION (NINGBO) CO., LTD., Zhejiang (CN)

(72) Inventor: Zhiyuan Li, Zhejiang (CN)

(73) Assignee: TCL COMMUNICATION (NINGBO) CO., LTD., Zhejiang (CN)

( * ) Notice: Subject to any disclaimer, the term of this patent is extended or adjusted under 35 U.S.C. 154(b) by 285 days.

(21) Appl. No.: 18/250,987

(22) PCT Filed: Dec. 7, 2020

(86) PCT No.: PCT/CN2020/134358
§ 371 (c)(1),
(2) Date: Apr. 28, 2023

(87) PCT Pub. No.: WO2022/088393
PCT Pub. Date: May 5, 2022

(65) Prior Publication Data
US 2023/0371035 A1 Nov. 16, 2023

(30) Foreign Application Priority Data
Oct. 29, 2020 (CN) .......................... 202011181571.1

(51) Int. Cl.
*H04W 72/23* (2023.01)
*H04W 72/0446* (2023.01)
*H04W 72/0453* (2023.01)

(52) U.S. Cl.
CPC ....... *H04W 72/23* (2023.01); *H04W 72/0446* (2013.01); *H04W 72/0453* (2013.01)

(58) Field of Classification Search
CPC ............. H04W 72/23; H04W 72/0446; H04W 72/0453; H04L 5/001; H04L 5/0058;
(Continued)

(56) References Cited

U.S. PATENT DOCUMENTS

2019/0149365 A1 5/2019 Chatterjee et al.
2019/0149380 A1* 5/2019 Babaei .................. H04W 72/23
370/330
(Continued)

FOREIGN PATENT DOCUMENTS

CN 102017432 A 4/2011
CN 106385709 A 2/2017
(Continued)

OTHER PUBLICATIONS

Written Opinion of the International Search Authority in international application No. PCT/CN2020/134358, mailed on Jul. 26, 2021.
(Continued)

*Primary Examiner* — Dady Chery
(74) *Attorney, Agent, or Firm* — PV IP PC; Wei Te Chung

(57) ABSTRACT

A resource allocation method, a terminal (300, 400), and a storage medium. The method comprises: determining a first frequency domain position of a resource in a first time slot among a plurality of aggregated consecutive time slots (101); determining a second frequency domain position of a resource in a second time slot after the first time slot according to the first frequency domain position and a preset frequency domain position offset policy (102); and allocating a PDSCH resource to a terminal according to the frequency domain position of a resource in each time slot among the plurality of consecutive time slots (103).

18 Claims, 7 Drawing Sheets

(58) Field of Classification Search
CPC ... H04L 5/0005; H04L 5/0007; H04L 5/0044; H04L 5/0053
See application file for complete search history.

(56) References Cited

U.S. PATENT DOCUMENTS

| | | | |
|---|---|---|---|
| 2019/0268920 A1 | 8/2019 | Falahati et al. | |
| 2020/0053722 A1 | 2/2020 | Choi et al. | |
| 2020/0229144 A1 | 7/2020 | Bharadwaj et al. | |
| 2020/0260456 A1 | 8/2020 | Shi et al. | |
| 2020/0275436 A1 | 8/2020 | Lin et al. | |
| 2021/0136827 A1* | 5/2021 | Xiong | H04W 74/006 |
| 2023/0217504 A1* | 7/2023 | Xiong | H04L 5/0044 370/329 |

FOREIGN PATENT DOCUMENTS

| | | |
|---|---|---|
| CN | 106664189 A | 5/2017 |
| CN | 110622453 A | 12/2019 |
| CN | 110832931 A | 2/2020 |
| CN | 110999447 A | 4/2020 |
| CN | 111107555 A | 5/2020 |
| CN | 111213421 A | 5/2020 |
| CN | 111385075 A | 7/2020 |
| CN | 111642017 A | 9/2020 |
| CN | 111756511 A | 10/2020 |
| EP | 3462795 A1 | 4/2019 |
| EP | 3520291 A1 | 8/2019 |

OTHER PUBLICATIONS

International Search Report in International application No. PCT/CN2020/134358, mailed on Jul. 26, 2021.
<3GPP tsg_ran\WG1_RL1> "R1-1803709" dated Apr. 7, 2018.
Chinese Office Action issued in corresponding Chinese Patent Application No. 202011181571.1 dated Apr. 27, 2022, pp. 1-8.
Notification to Grant Patent Right for Invention issued in corresponding Chinese Patent Application No. 202011181571.1 dated Jan. 20, 2023, pp. 1-5.

* cited by examiner

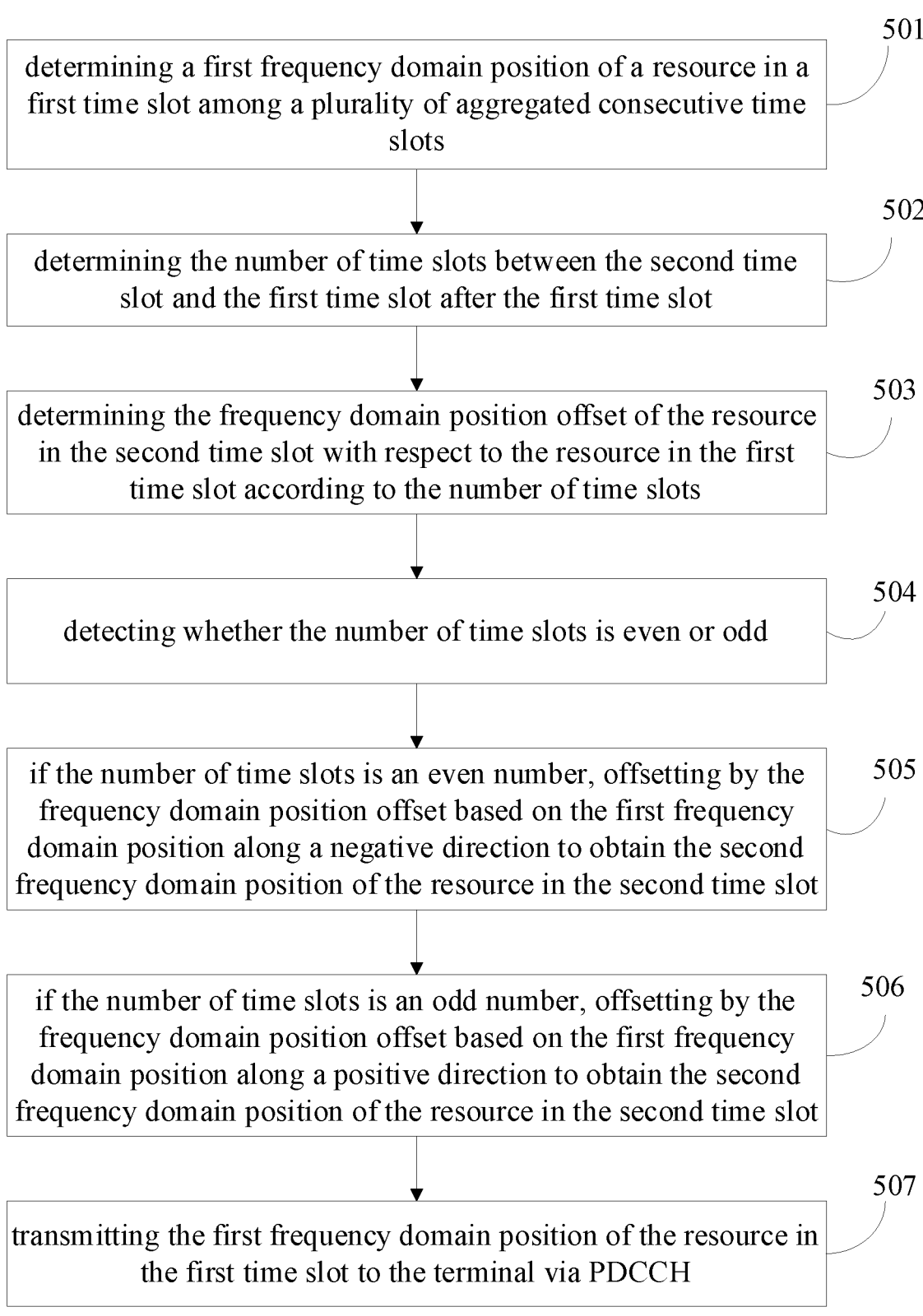

determining a first frequency domain position of a resource in a first time slot among a plurality of aggregated consecutive time slots — 501 determining the number of time slots between the second time slot and the first time slot after the first time slot — 502 determining the frequency domain position offset of the resource in the second time slot with respect to the resource in the first time slot according to the number of time slots — 503 detecting whether the number of time slots is even or odd — 504 if the number of time slots is an even number, offsetting by the frequency domain position offset based on the first frequency domain position along a negative direction to obtain the second frequency domain position of the resource in the second time slot — 505 if the number of time slots is an odd number, offsetting by the frequency domain position offset based on the first frequency domain position along a positive direction to obtain the second frequency domain position of the resource in the second time slot — 506 transmitting the first frequency domain position of the resource in the first time slot to the terminal via PDCCH — 507

FIG. 5

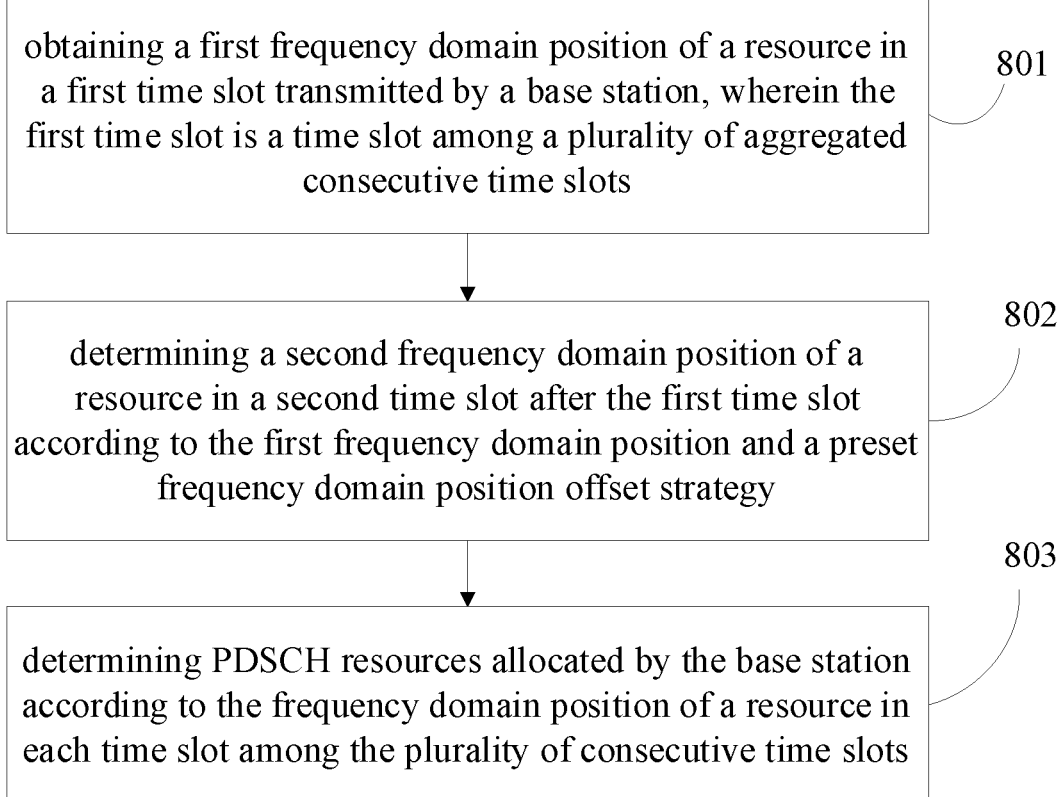

obtaining a first frequency domain position of a resource in a first time slot transmitted by a base station, wherein the first time slot is a time slot among a plurality of aggregated consecutive time slots
801 determining a second frequency domain position of a resource in a second time slot after the first time slot according to the first frequency domain position and a preset frequency domain position offset strategy
802

803 determining PDSCH resources allocated by the base station according to the frequency domain position of a resource in each time slot among the plurality of consecutive time slots

FIG. 8

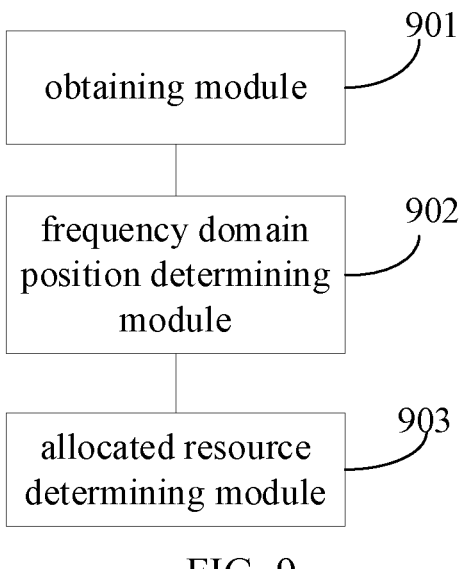

obtaining module
901 frequency domain position determining module
902 allocated resource determining module
903

RESOURCE ALLOCATION METHOD, TERMINAL AND STORAGE MEDIUM

This application claims the priority of International Application No. PCT/CN2020/134358, filed Dec. 7, 2020, which claims priority to Chinese Application No. 202011181571.1, filled on Oct. 29, 2020. The entire disclosures of each of the applications are incorporated herein by reference.

TECHNICAL FIELD

The present application relates to communication technologies, and more particularly to a resource allocation method, terminal and storage medium.

Background Arts

Physical downlink shared channel (PDSCH) in New Radio (NR) supports time slot aggregation for transmission to realize benefits in downlink coverage. This is mainly for users at cell edge to improve reliability of data transmission.

After time slot aggregation is configured, PDSCH uses the same time slot allocation for transmission. In multiple consecutive time slots, the content transmitted in each time slot is the same, and the redundancy version (RV) of a transport block (TB) of PDSCH is changed cyclically.

In the existing arts, the PDSCH time slot aggregation improves the reliability of PDSCH transmission under non-ideal conditions by repeated transmission and cyclically changed TB RV. However, PDSCH resources are allocated at the same position of bandwidth for the multiple consecutive time slots, and the effect of multipath in wireless environment results in fading channels. The same frequency domain positions of PDSCH resources in the multiple consecutive time slots will easily cause the PDSCH to experience channel fading in the same conditions in the frequency domain and reduce the probability of successfully demodulating the PDSCH by a user equipment (UE) in a non-ideal channel environment.

Technical Problems

Embodiments of the present application provides a resource allocation method, a terminal and a storage medium, which can reduce and increase the channel gain of PDSCH, and improve the rate of success in demodulating the PDSCH by a terminal in a non-ideal channel environment.

Technical Solutions

In a first aspect, an embodiment of the present application provides a resource allocation method, including:

- determining a first frequency domain position of a resource in a first time slot among a plurality of aggregated consecutive time slots;
- determining a second frequency domain position of a resource in a second time slot after the first time slot according to the first frequency domain position and a preset frequency domain position offset strategy; and
- allocating physical downlink shared channel (PDSCH) resources to a terminal according to the frequency domain position of a resource in each time slot among the plurality of consecutive time slots.

In some embodiments of the present application, the frequency domain position offset strategy includes a frequency domain position offset;

the determining the second frequency domain position of the resource in the second time slot after the first time slot according to the first frequency domain position and the preset frequency domain position offset strategy includes:

- determining the number of time slots between the second time slot and the first time slot;
- determining the frequency domain position offset of the resource in the second time slot with respect to the resource in the first time slot according to the number of time slots;
- determining the second frequency domain position of the resource in the second time slot according to the first frequency domain position and the frequency domain position offset.

In some embodiments of the present application, the determining the frequency domain position offset of the resource in the second time slot with respect to the resource in the first time slot according to the number of time slots includes:

- determining the frequency domain position offset of the resource in the second time slot with respect to the resource in the first time slot as one preset offset if the number of time slots is 0 or 1;
- determining the frequency domain position offset of the resource in the second time slot with respect to the resource in the first time slot as two preset offsets if the number of time slots is 2 or 3;
- determining the frequency domain position offset of the resource in the second time slot with respect to the resource in the first time slot as three preset offsets if the number of time slots is 4 or 5;
- determining the frequency domain position offset of the resource in the second time slot with respect to the resource in the first time slot as four preset offsets if the number of time slots is 6.

In some embodiments of the present application, the frequency domain position offset strategy includes a frequency domain position offset direction;

the determining the second frequency domain position of the resource in the second time slot according to the first frequency domain position and the frequency domain position offset includes:

- detecting whether the number of time slots is even or odd;
- determining the frequency domain position offset direction as a negative direction if the number of time slots is an even number, and offsetting by the frequency domain position offset based on the first frequency domain position along the negative direction to obtain the second frequency domain position of the resource in the second time slot;
- determining the frequency domain position offset direction as a positive direction if the number of time slots is an odd number, and offsetting by the frequency domain position offset based on the first frequency domain position along the positive direction to obtain the second frequency domain position of the resource in the second time slot.

In some embodiments of the present application, the second frequency domain position is a frequency domain start position of the resource in the second time slot;

the method further includes:

- allocating partial resources between the second frequency domain position and bandwidth boundary and allocating remaining resources in remaining bandwidth if a length of resources in frequency domain exceeds a length between the second frequency domain position and the bandwidth boundary, when allocating resources in the second time slot.

In some embodiments of the present application, the method further includes:

transmitting the first frequency domain position of the resource in the first time slot to the terminal via physical downlink control channel (PDCCH).

In a second aspect, an embodiment of the present application provides a resource allocation method, including:

obtaining a first frequency domain position of a resource in a first time slot transmitted by a base station, wherein the first time slot is a time slot among a plurality of aggregated consecutive time slots;

determining a second frequency domain position of a resource in a second time slot after the first time slot according to the first frequency domain position and a preset frequency domain position offset strategy; and determining physical downlink shared channel (PDSCH) resources allocated by the base station according to the frequency domain position of a resource in each time slot among the plurality of consecutive time slots.

In a third aspect, an embodiment of the present application provides a resource allocation device, including:

a first frequency domain position determining module, for determining a first frequency domain position of a resource in a first time slot among a plurality of aggregated consecutive time slots;

a second frequency domain position determining module, for determining a second frequency domain position of a resource in a second time slot after the first time slot according to the first frequency domain position and a preset frequency domain position offset strategy; and an allocating module, for allocating physical downlink shared channel (PDSCH) resources to a terminal according to the frequency domain position of a resource in each time slot among the plurality of consecutive time slots.

In a fourth aspect, an embodiment of the present application provides a resource allocation device, including:

an obtaining module, for obtaining a first frequency domain position of a resource in a first time slot transmitted by a base station, wherein the first time slot is a time slot among a plurality of aggregated consecutive time slots;

a frequency domain position determining module, for determining a second frequency domain position of a resource in a second time slot after the first time slot according to the first frequency domain position and a preset frequency domain position offset strategy; and an allocated resource determining module, for determining physical downlink shared channel (PDSCH) resources allocated by the base station according to the frequency domain position of a resource in each time slot among the plurality of consecutive time slots.

In a fifth aspect, an embodiment of the present application further provides a computer readable storage medium, wherein the storage medium stores a plurality of instructions applicable to be loaded by a processor to execute the following steps:

determining a first frequency domain position of a resource in a first time slot among a plurality of aggregated consecutive time slots;

determining a second frequency domain position of a resource in a second time slot after the first time slot according to the first frequency domain position and a preset frequency domain position offset strategy; and allocating physical downlink shared channel (PDSCH) resources to a terminal according to the frequency domain position of a resource in each time slot among the plurality of consecutive time slots.

In some embodiments of the present application, the frequency domain position offset strategy includes a frequency domain position offset;

when executing the determining the second frequency domain position of the resource in the second time slot after the first time slot according to the first frequency domain position and the preset frequency domain position offset strategy, the processor executes the following steps:

determining the number of time slots between the second time slot and the first time slot;

determining the frequency domain position offset of the resource in the second time slot with respect to the resource in the first time slot according to the number of time slots;

determining the second frequency domain position of the resource in the second time slot according to the first frequency domain position and the frequency domain position offset.

In some embodiments of the present application, when executing the determining the frequency domain position offset of the resource in the second time slot with respect to the resource in the first time slot according to the number of time slots, the processor executes the following steps:

determining the frequency domain position offset of the resource in the second time slot with respect to the resource in the first time slot as one preset offset if the number of time slots is 0 or 1;

determining the frequency domain position offset of the resource in the second time slot with respect to the resource in the first time slot as two preset offsets if the number of time slots is 2 or 3;

determining the frequency domain position offset of the resource in the second time slot with respect to the resource in the first time slot as three preset offsets if the number of time slots is 4 or 5;

determining the frequency domain position offset of the resource in the second time slot with respect to the resource in the first time slot as four preset offsets if the number of time slots is 6.

In some embodiments of the present application, the frequency domain position offset strategy includes a frequency domain position offset direction;

when executing the determining the second frequency domain position of the resource in the second time slot according to the first frequency domain position and the frequency domain position offset, the processor executes the following steps:

detecting whether the number of time slots is even or odd;

determining the frequency domain position offset direction as a negative direction if the number of time slots is an even number, and offsetting by the frequency domain position offset based on the first frequency domain position along the negative direction to obtain the second frequency domain position of the resource in the second time slot;

determining the frequency domain position offset direction as a positive direction if the number of time slots is an odd number, and offsetting by the frequency domain position offset based on the first frequency domain position along the positive direction to obtain the second frequency domain position of the resource in the second time slot.

In some embodiments of the present application, the second frequency domain position is a frequency domain start position of the resource in the second time slot;

the processor further executes the following step:

allocating partial resources between the second frequency domain position and bandwidth boundary and allocating remaining resources in remaining bandwidth if a length of resources in frequency domain exceeds a length between the second frequency domain position and the bandwidth boundary, when allocating resources in the second time slot.

In some embodiments of the present application, the processor further executes the following step:

transmitting the first frequency domain position of the resource in the first time slot to the terminal via physical downlink control channel (PDCCH).

In a sixth aspect, an embodiment of the present application provides a terminal, which includes a processor and a storage that are electrically connected to each other, wherein the storage is configured to store instructions and data, and the processor is configured to execute the following steps:

determining a first frequency domain position of a resource in a first time slot among a plurality of aggregated consecutive time slots;

determining a second frequency domain position of a resource in a second time slot after the first time slot according to the first frequency domain position and a preset frequency domain position offset strategy; and allocating physical downlink shared channel (PDSCH) resources to a terminal according to the frequency domain position of a resource in each time slot among the plurality of consecutive time slots.

In some embodiments of the present application, the frequency domain position offset strategy includes a frequency domain position offset;

when executing the determining the second frequency domain position of the resource in the second time slot after the first time slot according to the first frequency domain position and the preset frequency domain position offset strategy, the processor executes the following steps:

determining the number of time slots between the second time slot and the first time slot;

determining the frequency domain position offset of the resource in the second time slot with respect to the resource in the first time slot according to the number of time slots;

determining the second frequency domain position of the resource in the second time slot according to the first frequency domain position and the frequency domain position offset.

In some embodiments of the present application, when executing the determining the frequency domain position offset of the resource in the second time slot with respect to the resource in the first time slot according to the number of time slots, the processor executes the following steps:

determining the frequency domain position offset of the resource in the second time slot with respect to the resource in the first time slot as one preset offset if the number of time slots is 0 or 1;

determining the frequency domain position offset of the resource in the second time slot with respect to the resource in the first time slot as two preset offsets if the number of time slots is 2 or 3;

determining the frequency domain position offset of the resource in the second time slot with respect to the resource in the first time slot as three preset offsets if the number of time slots is 4 or 5;

determining the frequency domain position offset of the resource in the second time slot with respect to the resource in the first time slot as four preset offsets if the number of time slots is 6.

In some embodiments of the present application, the frequency domain position offset strategy includes a frequency domain position offset direction;

when executing the determining the second frequency domain position of the resource in the second time slot according to the first frequency domain position and the frequency domain position offset, the processor executes the following steps:

detecting whether the number of time slots is even or odd;

determining the frequency domain position offset direction as a negative direction if the number of time slots is an even number, and offsetting by the frequency domain position offset based on the first frequency domain position along the negative direction to obtain the second frequency domain position of the resource in the second time slot;

determining the frequency domain position offset direction as a positive direction if the number of time slots is an odd number, and offsetting by the frequency domain position offset based on the first frequency domain position along the positive direction to obtain the second frequency domain position of the resource in the second time slot.

In some embodiments of the present application, the second frequency domain position is a frequency domain start position of the resource in the second time slot;

the processor further executes the following step:

allocating partial resources between the second frequency domain position and bandwidth boundary and allocating remaining resources in remaining bandwidth if a length of resources in frequency domain exceeds a length between the second frequency domain position and the bandwidth boundary, when allocating resources in the second time slot.

In some embodiments of the present application, the processor further executes the following step:

transmitting the first frequency domain position of the resource in the first time slot to the terminal via physical downlink control channel (PDCCH).

Beneficial Effects

The resource allocation method, the base station, the terminal and the storage medium provided in this application can determine a first frequency domain position of a resource in a first time slot among a plurality of aggregated consecutive time slots and further determine a second frequency domain position of a resource in a second time slot after the first time slot according to the first frequency domain position and a preset frequency domain position offset strategy so as to allocate PDSCH resources to a terminal according to the frequency domain position of a resource in each time slot. In this way, the PDSCH resources are dispersed over the frequency domain positions in the plurality of consecutive time slots to increase the channel gain of PDSCH, prevent PDSCH from being experienced channel fading in the same conditions in the frequency domain and improve the rate of success in demodulating the PDSCH by a terminal in a non-ideal channel environment.

DESCRIPTION OF DRAWINGS

The technical solutions and other beneficial effects of the present application will be more apparent with reference to the detailed descriptions of the embodiments of the present application below in accompanying with the drawings.

FIG. 5 is another schematic flowchart of a resource allocation method provided in an embodiment of the present application.

FIG. 8 is still another schematic flowchart of a resource allocation method provided in an embodiment of the present application.

FIG. 9 is a structural schematic diagram illustrating another resource allocation device provided in an embodiment of the present application.

DESCRIPTION OF EMBODIMENTS OF THE INVENTION

The technical solutions in the embodiments of the present application are clearly and completely described below with reference to appending drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope of the present application.

A resource allocation method includes determining a first frequency domain position of a resource in a first time slot among a plurality of aggregated consecutive time slots; determining a second frequency domain position of a resource in a second time slot after the first time slot according to the first frequency domain position and a preset frequency domain position offset strategy; and allocating physical downlink shared channel (PDSCH) resources to a terminal according to the frequency domain position of a resource in each time slot among the plurality of consecutive time slots.

Figure 1:
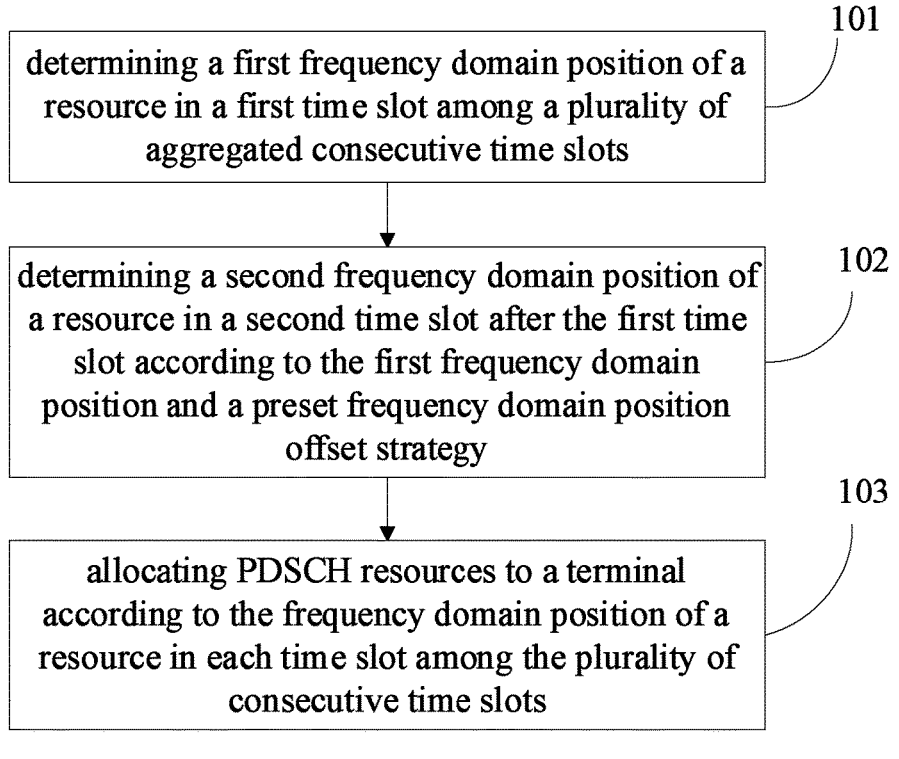
FIG. 1 is a schematic flowchart of a resource allocation method provided in an embodiment of the present application.

Refer to FIG. 1, which is a schematic flowchart of a resource allocation method provided in an embodiment of the present application. The resource allocation method is applied to a base station. The flow of the resource allocation method may be as follows:

101: determining a first frequency domain position of a resource in a first time slot among a plurality of aggregated consecutive time slots.

In an embodiment of the present invention, for the users at cell edge, in order to improve the reliability of data transmission, time slot aggregation is taken as a transmission way to transmit data for PDSCH, that is, the base station allocates a plurality of consecutive time slots to the terminal to transmit the same data. The time slot aggregation of PDSCH is configured by high layer signaling, such as:

pdsch-AggregationFactor ENUMERATED {n2,n4, n8}

The plurality of aggregated consecutive time slots in Step 101 may be 2, 4 or 8 consecutive time slots. In the plurality of aggregated consecutive time slots, the size of resource block (RB) resources of PDSCH does not change, that is, the size of resources in each time slot is the same, and the time domain position of RB resources of PDSCH is the same. The time domain resources can be specified by a field of time domain resource assignment of DCI 1_0 or DCI 1_1 in the PDCCH channel, but the frequency domain position of RB resources of PDSCH is different in the plurality of consecutive time slots.

In an embodiment of the present invention, the first time slot may be the first one among the plurality of consecutive time slots, and the first frequency domain position may be a frequency domain start position of the resource in the first time slot, which is represented by $RB_{Start\text{-}first}$. The first frequency domain position can be specified by a field of frequency domain resource assignment of DCI 1_0 or DCI 1_1 in the PDCCH channel. Specifically, the first frequency domain position can be determined in two ways:

(1) Bitmap (Type 0)

It can be known from a bitmap of the field of frequency domain resource assignment which resource block groups (RBGs) are allocated. How many consecutive RBs included in each RBG is specified by the protocol, and the value of which is P. Therefore, based on an indication of the bitmap of the field and the following formula, the first frequency domain position $RB_{Start\text{-}first}$ can be obtained.

$$N_{RBG} = \lceil (N_{BWP,i}^{size} + (N_{BWP,i}^{start} \bmod P))/P \rceil$$

where P is the size of RBG, which is specified by the protocol, and $N_{RBG}$ is the total number of RBGs in the bandwidth.

Figure 2:
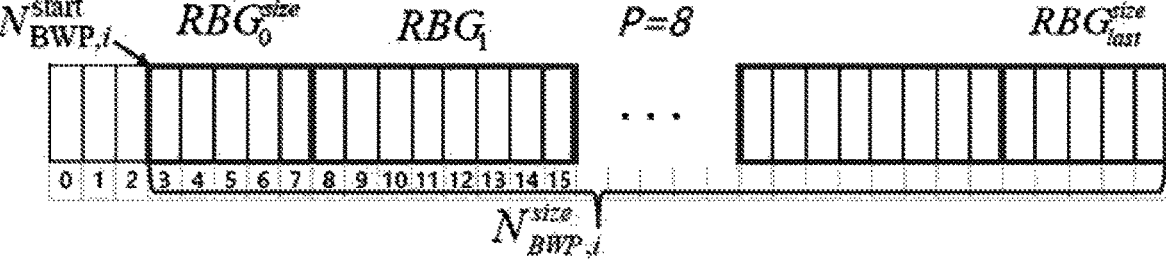
FIG. 2 is a schematic diagram illustrating allocation of frequency domain resources in a resource allocation method provided in an embodiment of the present application.

Bits are arranged from low frequency to high frequency, so the low bit of the bitmap starts from which RBG, the first RB of the RBG is the first frequency domain position $RB_{Start\text{-}first}$, as shown in FIG. 2. It should be noted that the number of RBs in the RBG starting from the bits and in the RBG ending at the bits are not necessarily P.

Assuming that the field of frequency domain resource assignment is 0111111110000, then the value of $RB_{Start}$ is 8.

(2) Resource Indication Value (RIV) (Type 1)

Based on the value of frequency domain resource assignment indicated by RIV and the following formula, the first frequency domain position $RB_{Start\text{-}first}$ can be obtained.

If $(L_{RBs}-1) \le \lfloor N_{BWP}^{size}/2 \rfloor$, then $$RIV = N_{BWP}^{size}(L_{RBs}-1) + RB_{start\text{-}first};$$

otherwise, $RIV = N_{BWP}^{size}(L_{RBs}-1) + RB_{start\text{-}first}$ where $N_{BWP}{}^{size}$–$RB_{star\text{-}firstt}$<$L_{RBs}$≤1, $N_{BWP}{}^{size}$ is the total number of RBs in the bandwidth, $L_{RBs}$ is the length of scheduled consecutive resources of PDSCH channel, and RIV is the value of the field.

After determining the first frequency domain position of the resource in the first time slot, the frequency domain start position of subsequent time slots can be determined according to a preset frequency domain position offset strategy.

102: determining a second frequency domain position of a resource in a second time slot after the first time slot according to the first frequency domain position and a preset frequency domain position offset strategy.

In an embodiment of the present invention, the second time slot may be any time slot located after the first time slot in the plurality of consecutive time slots, and the second frequency domain position may be the frequency domain start position of the resource in the second time slot. Since the size of resources in each time slot is fixed, the overall frequency domain position of the resource in the second time slot can be determined according to the frequency domain start position of the resource in the second time slot and the fixed size of resources.

The preset frequency domain position offset strategy may include a frequency domain position offset and a frequency domain position offset direction based on the first frequency domain position, that is, according to the ordering of the second time slot in the plurality of consecutive time slots, corresponding frequency domain position offset and frequency domain position offset direction may be set, that is, for other time slots in the plurality of consecutive time slots except the first time slot, the frequency domain position offset and/or the frequency domain position offset direction is different from each other.

Specifically, the determining the second frequency domain position of the resource in the second time slot after the first time slot according to the first frequency domain position and the preset frequency domain position offset strategy in Step 102 includes:

determining the number of time slots between the second time slot and the first time slot;

determining the frequency domain position offset of the resource in the second time slot with respect to the resource in the first time slot according to the number of time slots;

determining the second frequency domain position of the resource in the second time slot according to the first frequency domain position and the frequency domain position offset.

It should be noted that the first time slot may be the first one of the plurality of consecutive time slots, and according to the number of time slots between the second time slot and the first time slot, it can be determined the ordering of the second time slot in the plurality of consecutive time slots. For example, if the number of time slots between the second time slot and the first time slot is 0, it indicates that the second time slot is the second one in the plurality of consecutive time slots; if the number of time slots between the second time slot and the first time slot is 1, it indicates that the second time slot is the third one in the plurality of consecutive time slots.

According to the ordering of the second time slot in the plurality of consecutive time slots, it can be determined the frequency domain position offset of the resource in the second time slot with respect to the resource in the first time slot. The more in the back the second time slot is arranged in the plurality of consecutive time slots, the greater the frequency domain position offset of the resource in the second time slot is, or the more in the back the second time slot is arranged in the plurality of consecutive time slots, the smaller the frequency domain position offset of the resource in the second time slot is.

For example, if the number of time slots is 0 or 1, that is, the second time slot is the second one or the third one in the plurality of consecutive time slots, then the frequency domain position offset of the resource in the second time slot with respect to the resource in the first time slot is determined as one preset offset; if the number of time slots is 2 or 3, that is, the second time slot is the fourth one or the fifth one in the plurality of consecutive time slots, then the frequency domain position offset of the resource in the second time slot with respect to the resource in the first time slot is determined as two preset offsets; if the number of time slots is 4 or 5, that is, the second time slot is the sixth one or the seventh one in the plurality of consecutive time slots, then the frequency domain position offset of the resource in the second time slot with respect to the resource in the first time slot is determined as three preset offsets; if the number of time slots is 6, that is, the second time slot is the eighth one in the plurality of consecutive time slots, then the frequency domain position offset of the resource in the second time slot with respect to the resource in the first time slot is determined as four preset offsets.

Since the plurality of aggregated consecutive time slots are generally 2, 4 or 8 time slots, only the cases of at most 8 time slots are listed above. If the plurality of aggregated consecutive time slots can include more time slots, the number of the preset offsets can increase based on afore-described cases. For example, if the number of time slots is 7 or 8, that is, the second time slot is the ninth one or the tenth one in the plurality of consecutive time slots, then the frequency domain position offset of the resource in the second time slot with respect to the resource in the first time slot is determined as five preset offsets.

The preset offset is a fixed offset, which can be set as $$\left\lfloor \frac{N_{BWP}^{size}}{n} \right\rfloor,$$

where $N_{BWP}{}^{size}$ is the total number of RBs in the bandwidth, and n is the number of consecutive time slots, generally taking a value of 2, 4 or 8, that is, when the plurality of consecutive time slots are 2 time slots, n=2; when the plurality of consecutive time slots are 4 time slots, n=4; when the plurality of consecutive time slots are 8 time slots, n=8.

Since one frequency domain position offset is set for every two time slots after the first time slot, for two time slots with the same frequency domain position offset, their frequency domain position offset directions can be different, for example, the frequency domain position of the resource in one time slot offsets along a positive direction while the frequency domain position of the resource in the other time slot offsets along a negative direction. The offsetting along the positive direction refers to an offset toward a high-frequency direction of the broadband, and the offsetting along the negative direction refers to an offset toward a low-frequency direction of the broadband.

Specifically, the determining the second frequency domain position of the resource in the second time slot according to the first frequency domain position and the frequency domain position offset includes:

detecting whether the number of time slots is even or odd;

determining the frequency domain position offset direction as a negative direction if the number of time slots is an even number, and offsetting by the frequency domain position offset based on the first frequency domain position along the negative direction to obtain the second frequency domain position of the resource in the second time slot;

determining the frequency domain position offset direction as a positive direction if the number of time slots is an odd number, and offsetting by the frequency domain position offset based on the first frequency domain position along the positive direction to obtain the second frequency domain position of the resource in the second time slot.

It should be noted that if the number of time slots between the second time slot and the first time slot is an even number, it indicates that the second time slot is in an even column in the sequence, that is, the second time slot is the second one, the fourth one, the sixth one or the eighth one in the plurality of consecutive time slots, and in this case the first frequency domain position is taken as a start point, and offset by a corresponding frequency domain offset along the negative direction to obtain the frequency domain position of the resource in the corresponding slot; if the number of time slots between the second time slot and the first time slot is an odd number, it indicates that the second time slot is in an odd column in the sequence, that is, the second time slot is the third one, the fifth one or the seventh one in the plurality of consecutive time slots, and in this case the first frequency domain position is taken as a start point, and offset by a corresponding frequency domain offset along the negative direction to obtain the frequency domain position of the resource in the corresponding slot.

Alternatively, if the number of time slots between the second time slot and the first time slot is an even number, then offset by the frequency domain position offset based on the first frequency domain position along the positive direction to obtain the second frequency domain position of the resource in the second time slot; if the number of time slots between the second time slot and the first time slot is an odd number, then offset by the frequency domain position offset based on the first frequency domain position along the positive direction to obtain the second frequency domain position of the resource in the second time slot.

Specifically, the frequency domain start position of the resource in the i-th time slot after the first time slot can be obtained according to the following formula:

$$RB_{Starti} = RB_{Start\text{-}first} + \Delta \text{offset}$$

where $RB_{Starti}$ is the frequency domain start position of the resource in the i-th time slot, and $RB_{Start\text{-}first}$ is the frequency domain start position of the resource in the first time slot, the numerical value of $\Delta$offset represents the frequency domain position offset, and the positive or negative sign of $\Delta$offset represents the frequency domain position offset direction, where the positive sign may indicate a positive frequency offset and the negative sign may indicate a negative frequency offset.

Specifically, $\Delta$offset can be calculated according to the following formula:

$$(-1)^{(Slot_i \bmod 2)} \cdot \left\lfloor \frac{N_{BWP}^{size}}{n} \right\rfloor \quad Slot_i - Slot_{first} \leq 2;$$

-continued $$(-1)^{(Slot_i \bmod 2)} \cdot \left\lfloor \frac{N_{BWP}^{size}}{n} \right\rfloor \cdot 2 \quad Slot_i - Slot_{first} \leq 4;$$

$$(-1)^{(Slot_i \bmod 2)} \cdot \left\lfloor \frac{N_{BWP}^{size}}{n} \right\rfloor \cdot 3 \quad Slot_i - Slot_{first} \leq 6;$$

$$(-1)^{(Slot_i \bmod 2)} \cdot \left\lfloor \frac{N_{BWP}^{size}}{n} \right\rfloor \cdot 4 \quad Slot_i - Slot_{first} \leq 7$$

where $Slot_{first}$ is the ID of the first time slot in the plurality of consecutive time slots, such as 0, and $Slot_i$ is the ID of the i-th time slot in the plurality of consecutive time slots, such as the IDs from the second time slot to the eighth time slot can be 1, 2, 3, 4, 5, 6, 7.

Figure 3:
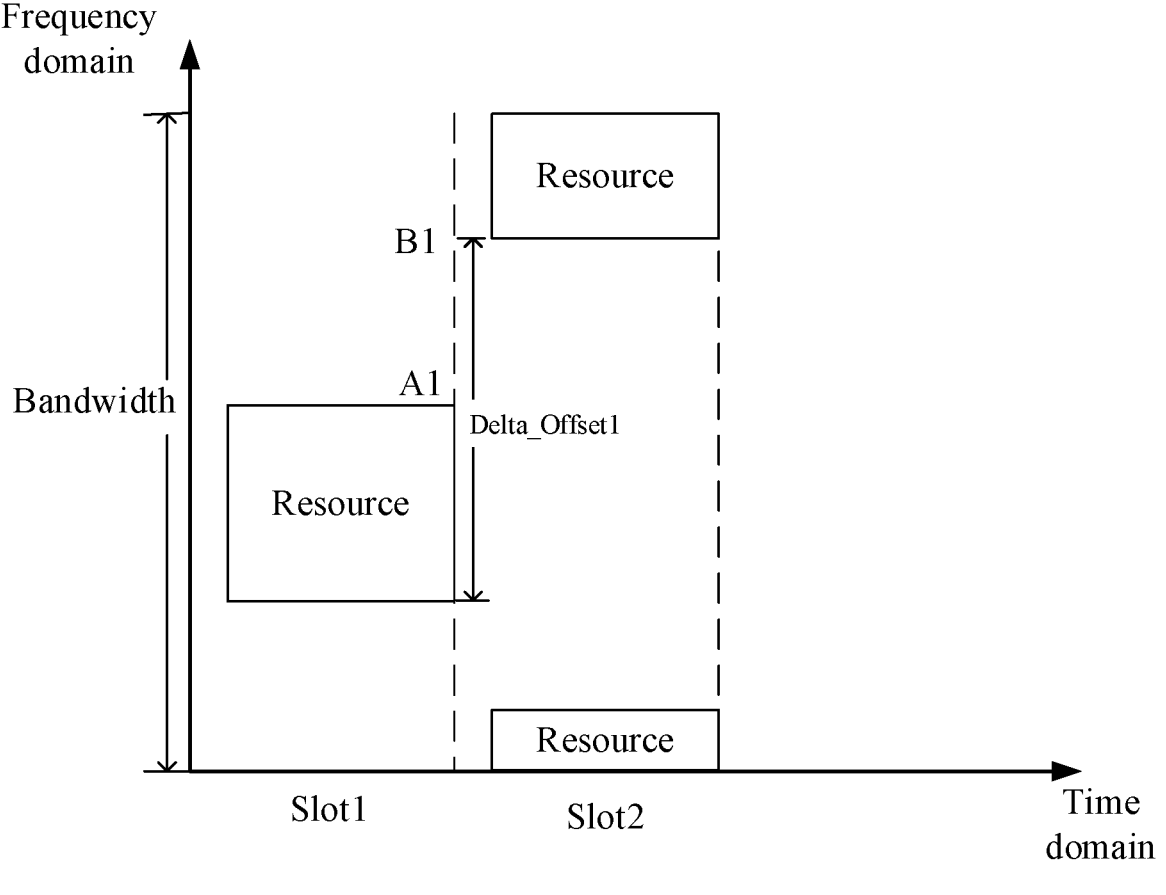
FIG. 3 is a schematic diagram illustrating resource allocation for a plurality of consecutive time slots in a resource allocation method provided in an embodiment of the present application.

As shown in FIG. 3, when there are two consecutive time slots, the first frequency domain position of the resource in the first time slot Slot1 is determined to be A1 in advance, and according to the preset frequency domain position offset strategy, it is determined that the frequency domain position offset of the resource in the second time slot Slot2 is Delta_offset1 and the frequency domain position offset direction is a positive offset, and it can then obtained that the second frequency domain position of the resource in the second time slot is B1.

Figure 4:
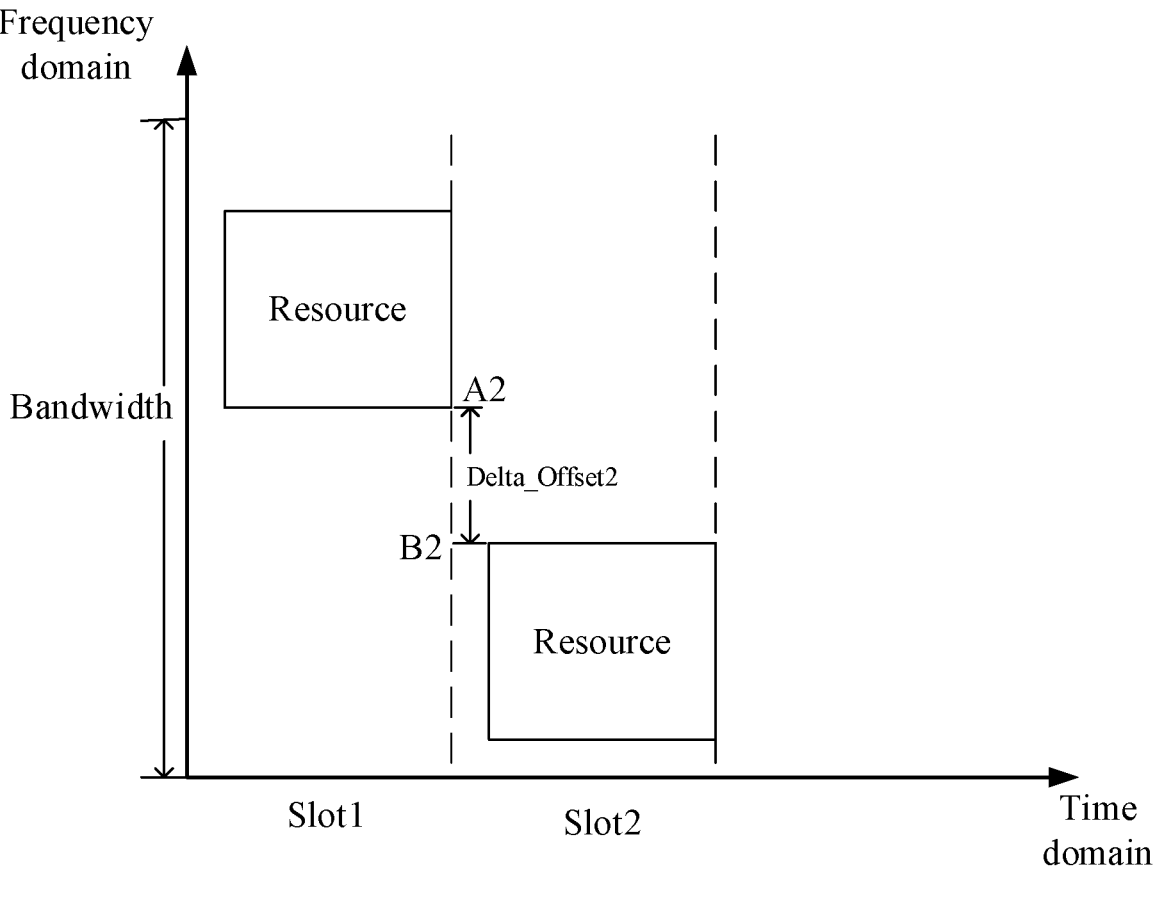
FIG. 4 is a schematic diagram illustrating another resource allocation for a plurality of consecutive time slots in a resource allocation method provided in an embodiment of the present application.

Alternatively, as shown in FIG. 4, when there are two consecutive time slots, the first frequency domain position of the resource in the first time slot Slot1 is determined to be A2 in advance, and according to the preset frequency domain position offset strategy, it is determined that the frequency domain position offset of the resource in the second time slot Slot2 is Delta_offset2 and the frequency domain position offset direction is a negative offset, and it can then obtained that the second frequency domain position of the resource in the second time slot is B2.

103: allocating physical downlink shared channel (PDSCH) resources to a terminal according to the frequency domain position of a resource in each time slot among the plurality of consecutive time slots.

In the embodiment of the present invention, by using the frequency domain position resource strategy in Step 102 to disperse the frequency domain positions of resources in different time slots, the frequency domain start position of the resource in each time slot is different from each other such that the channel gain of PDSCH increases. The PDSCH resources are allocated to the terminal based on the frequency domain start position of the resource in each time slot and the fixed resource size. Since the subband fading on the entire bandwidth is inconsistent and instead of unchanged, the channel condition is changed dynamically, the frequency domain positions of the resources in different time slots are different, so that the PDSCH will not experience channel fading in the same conditions in the frequency domain. Even if the frequency domain positions of the resources in some time slots are on the narrowband with the worst fading condition, the terminal can also resolve the data according to the PDSCH resources in other time slots. Since the data transmitted in each time slot in the plurality of consecutive time slots is the same, the terminal can obtain the data transmitted by the base station as long as the PDSCH of one time slot is successfully demodulated by the terminal, thereby improving the probability of successfully demodulating the PDSCH by the terminal in a non-ideal channel environment.

Further, the method further includes:

allocating partial resources between the second frequency domain position and bandwidth boundary and allocating remaining resources in remaining bandwidth if a length of resources in frequency domain exceeds a length between the second frequency domain position and the bandwidth boundary, when allocating resources in the second time slot.

It should be noted that the second frequency domain position is the frequency domain start position of the resource in the second time slot, the bandwidth is the bandwidth of the PDSCH channel, and the bandwidth boundary can be an upper-limit frequency of the bandwidth or a lower-limit frequency of the bandwidth. After the second frequency domain position is determined, if the frequency band between the second frequency domain position and the bandwidth boundary is not enough to allocate the PDSCH resources, the frequency band is first allocated to a part of PDSCH resources, and then the remaining unallocated resources are allocated in the remaining bandwidth. The bandwidth boundary refers to the bandwidth boundary in the frequency domain position offset direction of the resource in the second time slot. If the frequency domain position offset direction of the resource in the second time slot is positive, then the broadband boundary is the upper-limit frequency of the broadband, and in this case a part of resources are first allocated between the second frequency domain position and the upper-limit frequency of the broadband, and the remaining resources are then allocated from the lower-limit frequency of the broadband; if the frequency domain position offset direction of the resource in the second time slot is negative, then the broadband boundary is the lower-limit frequency of the broadband, and in this case a part of resources are first allocated between the second frequency domain position and the lower-limit frequency of the broadband, and the remaining resources are then allocated from the upper-limit frequency of the broadband.

As shown in FIG. 3, the resources in the second time slot Slot2 are allocated into two parts. Since the frequency domain position offset direction of the resource in the second time slot Slot2 is positive, a par of resources in the second time slot Slot2 is allocated between the second frequency domain position and the upper-limit frequency of the bandwidth, and another part of resources is allocated from the lower-limit frequency of the bandwidth.

Further, the method further includes:

transmitting the first frequency domain position of the resource in the first time slot to the terminal via physical downlink control channel (PDCCH).

It should be noted that after the base station determines the first frequency domain position of the resource in the first time slot, it only needs to transmit the first frequency domain position to the terminal via PDCCH, and the second frequency domain position of the resource in the second time slot does not need to be transmitted to the terminal via the PDCCH again, so that the scheduling complexity will not increase. The terminal is pre-configured with the same frequency domain position offset strategy in the base station. After receiving the first frequency domain position, the base station can calculate the second frequency domain position of the resource in the second time slot based on the first frequency domain position and the frequency domain position offset strategy, so as to obtain the PDSCH resource allocated by the base station and achieve resolving of the data.

Refer to FIG. 5, which is a schematic flowchart of a resource allocation method provided in an embodiment of the present application. The resource allocation method is applied to a base station. The flow of the resource allocation method may be as follows:

501: determining a first frequency domain position of a resource in a first time slot among a plurality of aggregated consecutive time slots.

Figure 6:
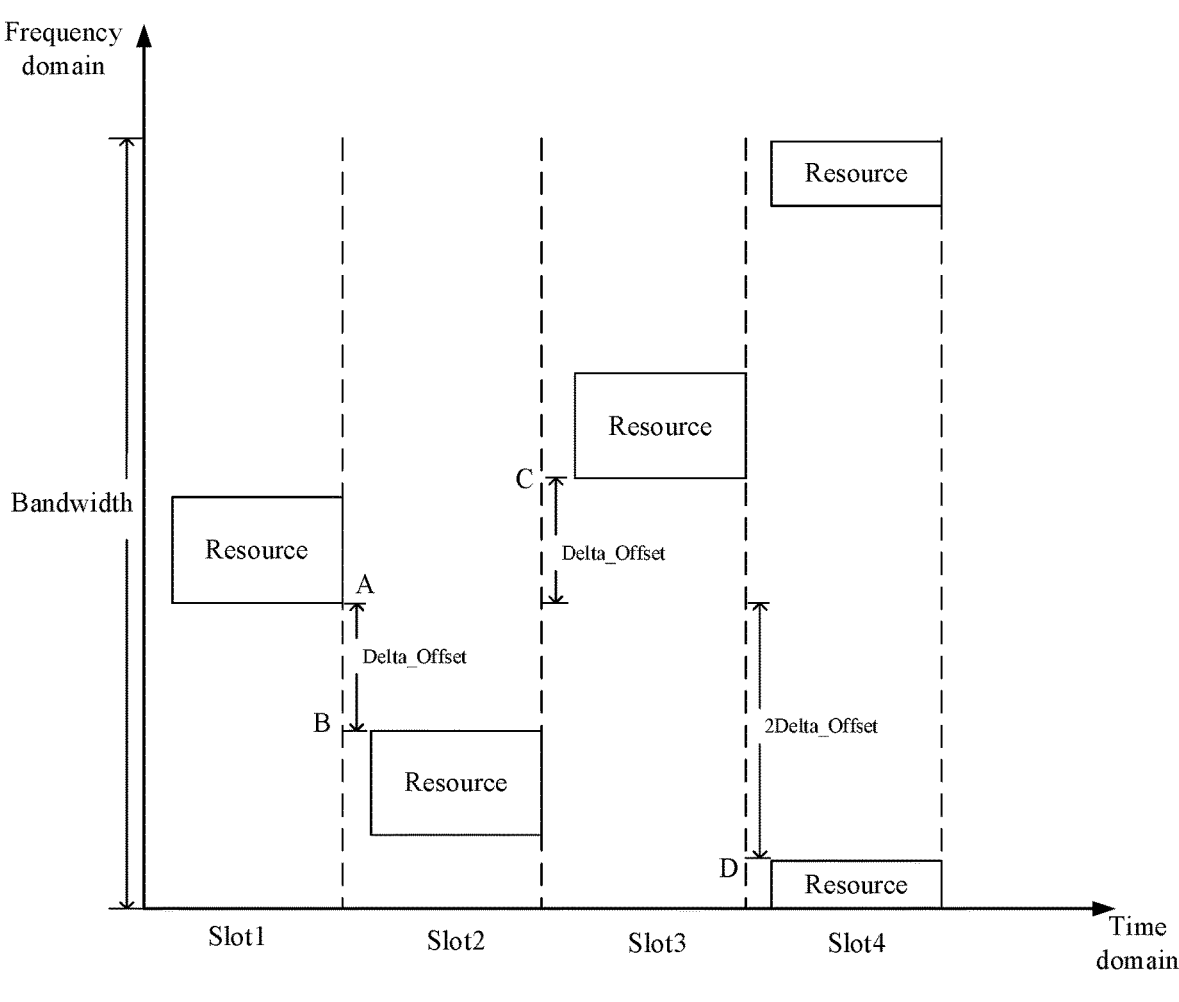
FIG. 6 is a schematic diagram illustrating still another resource allocation for a plurality of consecutive time slots in a resource allocation method provided in an embodiment of the present application.

The first time slot is the first one of time slots. As shown in FIG. 6, the plurality of consecutive time slots are 4 time slots, and the frequency domain position of the resource in the first time slot Slot1 is determined as A.

502: determining the number of time slots between the second time slot and the first time slot after the first time slot.

The second time slot is any time slot after the first time slot. As shown in FIG. 6, the second time slot may be the second one of the time slots, Slot2, the third one of the time slots, Slot3, or the fourth one of the time slots, Slot4. The number of time slots between the second time slot Slot2 and the first time slot Slot1 is 0; the number of time slots between the third time slot Slot3 and the first time slot Slot1 is 1; the number of time slots between the fourth time slot Slot4 and the first time slot Slot1 is 2.

503: determining the frequency domain position offset of the resource in the second time slot with respect to the resource in the first time slot according to the number of time slots.

When the number of time slots between the second time slot and the first time slot is 0 or 1, the frequency domain position offset of the resource in the second time slot with respect to the resource in the first time slot is Delta_offset; when the number of time slots between the second time slot and the first time slot is 2, the frequency domain position offset of the resource in the second time slot with respect to the resource in the first time slot is 2 Delta_offset. As shown in FIG. 6, the frequency domain position offset of the resource in the second time slot Slot2 and the third time slot Slot3 is Delta_offset, and the frequency domain position offset of the resource in the fourth time slot Slot4 is 2 Delta_offset.

504: detecting whether the number of time slots is even or odd.

As shown in FIG. 6, the number of time slots between the first time slot Slot1 and the second time slot Slot2 or the fourth time slot Slot4 is an even number, and the number of time slots between the first time slot Slot1 and the third time slot Slot3 is an odd number.

505: if the number of time slots is an even number, offsetting by the frequency domain position offset based on the first frequency domain position along a negative direction to obtain the second frequency domain position of the resource in the second time slot.

As shown in FIG. 6, the second time slot Slot2 and the fourth time slot Slot4 correspond to negative offsets. Specifically, for the second time slot Slot2, offset by Delta_offset based on the first frequency domain position A along the negative direction to obtain the frequency domain position B of the second time slot Slot2; for the fourth time slot Slot4, offset by 2 Delta_offset based on the first frequency domain position A to obtain the frequency domain position D of the fourth time slot Slot4. Since the length between the frequency domain position D and the lower-limit frequency of the bandwidth is smaller than the length of resources in the frequency domain, a part of resources in the fourth time slot Slot4 is allocated between the frequency domain position D and the lower-limit frequency of the bandwidth, and the remaining resources in the fourth time slot Slot4 are allocated from the upper-limit frequency of the bandwidth.

506: if the number of time slots is an odd number, offsetting by the frequency domain position offset based on the first frequency domain position along a positive direction to obtain the second frequency domain position of the resource in the second time slot.

As shown in FIG. 6, the third time slot Slot3 correspond to positive offsets. Specifically, for the third time slot Slot3, offset by Delta_offset based on the first frequency domain position A along the positive direction to obtain the frequency domain position C of the third time slot Slot3.

507: transmitting the first frequency domain position of the resource in the first time slot to the terminal via physical downlink control channel (PDCCH).

As shown in FIG. 6, the first frequency domain position A of the resource in the first time slot Slot1 is transmitted to the terminal via PDCCH, and the frequency domain positions B, C and D in the second time slot Slot2, the third time slot Slot3 and the fourth time slot Slot4 do not need to be transmitted to the terminal. The terminal can calculate them by itself according to the preset frequency domain position offset strategy and the first frequency domain position A in the first time slot Slot1, so as to avoid an increase of scheduling complexity.

It can be known from above descriptions that the resource allocation method provided in this application can determine a first frequency domain position of a resource in a first time slot among a plurality of aggregated consecutive time slots and further determine a second frequency domain position of a resource in a second time slot after the first time slot according to the first frequency domain position and a preset frequency domain position offset strategy so as to allocate PDSCH resources to a terminal according to the frequency domain position of a resource in each time slot. In this way, the PDSCH resources are dispersed over the frequency domain positions in the plurality of consecutive time slots to increase the channel gain of PDSCH, prevent PDSCH from being experienced channel fading in the same conditions in the frequency domain and improve the rate of success in demodulating the PDSCH by a terminal in a non-ideal channel environment.

According to the methods described in above embodiments, this embodiment will be further described from the perspective of a resource allocation device, and the resource allocation device may be integrated in a base station.

Figure 7:
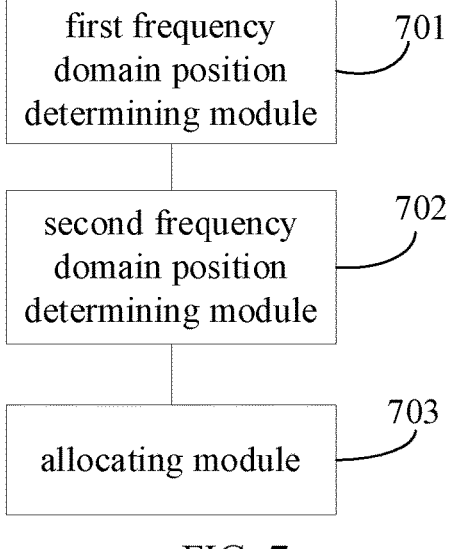
FIG. 7 is a structural schematic diagram illustrating a resource allocation device provided in an embodiment of the present application.

Referring to FIG. 7, this figure illustrates a resource allocation device provided in an embodiment of the present application. The resource allocation device may include a first frequency domain position determining module 701, a second frequency domain position determining module 702, and an allocating module 703.

(1) First Frequency Domain Position Determining Module 701

The first frequency domain position determining module 701 is configured for determining a first frequency domain position of a resource in a first time slot among a plurality of aggregated consecutive time slots.

In an embodiment of the present invention, the plurality of aggregated consecutive time slots may be 2, 4 or 8 consecutive time slots. In the plurality of aggregated consecutive time slots, the size of resource block (RB) resources of PDSCH does not change, that is, the size of resources in each time slot is the same, and the time domain position of RB resources of PDSCH is the same. The time domain resources can be specified by a field of time domain resource assignment of DCI 1_0 or DCI 1_1 in the PDCCH channel, but the frequency domain position of RB resources of PDSCH is different in the plurality of consecutive time slots.

The first time slot may be the first one among the plurality of consecutive time slots, and the first frequency domain position may be a frequency domain start position of the resource in the first time slot, which is represented by $RB_{Start\text{-}first}$. The first frequency domain position can be specified by a field of frequency domain resource assignment of DCI 1_0 or DCI 1_1 in the PDCCH channel.

(2) Second Frequency Domain Position Determining Module 702

The second frequency domain position determining module 702 is configured for determining a second frequency domain position of a resource in a second time slot after the first time slot according to the first frequency domain position and a preset frequency domain position offset strategy.

In an embodiment of the present invention, the second time slot may be any time slot located after the first time slot in the plurality of consecutive time slots, and the second frequency domain position may be the frequency domain start position of the resource in the second time slot. Since the size of resources in each time slot is fixed, the overall frequency domain position of the resource in the second time slot can be determined according to the frequency domain start position of the resource in the second time slot and the fixed size of resources.

The preset frequency domain position offset strategy may include a frequency domain position offset and a frequency domain position offset direction based on the first frequency domain position, that is, according to the ordering of the second time slot in the plurality of consecutive time slots, corresponding frequency domain position offset and frequency domain position offset direction may be set, that is, for other time slots in the plurality of consecutive time slots except the first time slot, the frequency domain position offset and/or the frequency domain position offset direction is different from each other.

(3) Allocating Module 703

The allocating module 703 is configured for allocating physical downlink shared channel (PDSCH) resources to a terminal according to the frequency domain position of a resource in each time slot among the plurality of consecutive time slots.

In the embodiment of the present invention, by using the frequency domain position resource strategy to disperse the frequency domain position of the resource in each time slot, the frequency domain start position of the resource in each time slot is different from each other such that the channel gain of PDSCH increases. The PDSCH resources are allocated to the terminal based on the frequency domain start position of the resource in each time slot and the fixed resource size. Since the subband fading on the entire bandwidth is inconsistent and instead of unchanged, the channel condition is changed dynamically, the frequency domain positions of the resources in different time slots are different, so that the PDSCH will not experience channel fading in the same conditions in the frequency domain. Even if the frequency domain positions of the resources in some time slots are on the narrowband with the worst fading condition, the terminal can also resolve the data according to the PDSCH resources in other time slots. Since the data transmitted in each time slot in the plurality of consecutive time slots is the same, the terminal can obtain the data transmitted by the base station as long as the PDSCH of one time slot is successfully demodulated by the terminal, thereby improving the probability of successfully demodulating the PDSCH by the terminal in a non-ideal channel environment.

In some embodiments of the present application, the frequency domain position offset strategy includes a frequency domain position offset; the second frequency domain position determining module 702 is configured for:

determining the number of time slots between the second time slot and the first time slot;

determining the frequency domain position offset of the resource in the second time slot with respect to the resource in the first time slot according to the number of time slots;

determining the second frequency domain position of the resource in the second time slot according to the first frequency domain position and the frequency domain position offset.

In some embodiments of the present application, the second frequency domain position determining module 702 is further configured for:

determining the frequency domain position offset of the resource in the second time slot with respect to the resource in the first time slot as one preset offset if the number of time slots is 0 or 1;

determining the frequency domain position offset of the resource in the second time slot with respect to the resource in the first time slot as two preset offsets if the number of time slots is 2 or 3;

determining the frequency domain position offset of the resource in the second time slot with respect to the resource in the first time slot as three preset offsets if the number of time slots is 4 or 5;

determining the frequency domain position offset of the resource in the second time slot with respect to the resource in the first time slot as four preset offsets if the number of time slots is 6.

In some embodiments of the present application, the frequency domain position offset strategy includes a frequency domain position offset direction; the second frequency domain position determining module 702 is further configured for:

detecting whether the number of time slots is even or odd;

determining the frequency domain position offset direction as a negative direction if the number of time slots is an even number, and offsetting by the frequency domain position offset based on the first frequency domain position along the negative direction to obtain the second frequency domain position of the resource in the second time slot;

determining the frequency domain position offset direction as a positive direction if the number of time slots is an odd number, and offsetting by the frequency domain position offset based on the first frequency domain position along the positive direction to obtain the second frequency domain position of the resource in the second time slot.

In some embodiments of the present application, the second frequency domain position is a frequency domain start position of the resource in the second time slot; the device further includes a resource allocating module, which is configured for:

allocating partial resources between the second frequency domain position and bandwidth boundary and allocating remaining resources in remaining bandwidth if a length of resources in frequency domain exceeds a length between the second frequency domain position and the bandwidth boundary, when allocating resources in the second time slot.

In some embodiments of the present application, the device further includes a transmitting module, which is configured for:

transmitting the first frequency domain position of the resource in the first time slot to the terminal via physical downlink control channel (PDCCH).

It can be known from above descriptions that the resource allocation device provided in this application can determine a first frequency domain position of a resource in a first time slot among a plurality of aggregated consecutive time slots and further determine a second frequency domain position of a resource in a second time slot after the first time slot according to the first frequency domain position and a preset frequency domain position offset strategy so as to allocate PDSCH resources to a terminal according to the frequency domain position of a resource in each time slot. In this way, the PDSCH resources are dispersed over the frequency domain positions in the plurality of consecutive time slots to increase the channel gain of PDSCH, prevent PDSCH from being experienced channel fading in the same conditions in the frequency domain and improve the rate of success in demodulating the PDSCH by a terminal in a non-ideal channel environment.

Refer to FIG. 8, which is a schematic flowchart of a resource allocation method provided in an embodiment of the present application. The resource allocation method is applied to a terminal. The flow of the resource allocation method may be as follows:

801: obtaining a first frequency domain position of a resource in a first time slot transmitted by a base station, wherein the first time slot is a time slot among a plurality of aggregated consecutive time slots.

In an embodiment of the present invention, the plurality of consecutive time slots may be 2, 4 or 8 consecutive time slots. In the plurality of aggregated consecutive time slots, the size of resource block (RB) resources of PDSCH does not change, that is, the size of resources in each time slot is the same, and the time domain position of RB resources of PDSCH is the same. The time domain resources can be specified by a field of time domain resource assignment of DCI 1_0 or DCI 1_1 in the PDCCH channel, but the frequency domain position of RB resources of PDSCH is different in the plurality of consecutive time slots.

The first time slot may be the first one among the plurality of consecutive time slots, and the first frequency domain position may be a frequency domain start position of the resource in the first time slot, which is represented by $RB_{Start\text{-}first}$. The first frequency domain position can be specified by a field of frequency domain resource assignment of DCI 1_0 or DCI 1_1 in the PDCCH channel.

After determining the first frequency domain position of the resource in the first time slot, the base station only needs to transmit the first frequency domain position to the terminal via PDCCH.

802: determining a second frequency domain position of a resource in a second time slot after the first time slot according to the first frequency domain position and a preset frequency domain position offset strategy.

In an embodiment of the present application, the second time slot may be any time slot located after the first time slot in the plurality of consecutive time slots, and the second frequency domain position may be the frequency domain start position of the resource in the second time slot. Since the size of resources in each time slot is fixed, the overall frequency domain position of the resource in the second time slot can be determined according to the frequency domain start position of the resource in the second time slot and the fixed size of resources.

The terminal is pre-configured with the same frequency domain position offset strategy as the base station. Since the resource allocation of the second time slot in the base station is based on the first frequency domain position and the frequency domain position offset strategy, the terminal can adopt the frequency domain position offset strategy after obtaining the first frequency domain position, to obtain the second frequency domain position of the resource in the second time slot.

The frequency domain position offset strategy may include a frequency domain position offset and a frequency domain position offset direction based on the first frequency domain position, that is, according to the ordering of the second time slot in the plurality of consecutive time slots, corresponding frequency domain position offset and frequency domain position offset direction can be determined to determine the second frequency domain position.

803: determining physical downlink shared channel (PDSCH) resources allocated by the base station according to the frequency domain position of a resource in each time slot among the plurality of consecutive time slots.

In the embodiment of the present application, the frequency domain positions of resources in different time slots are dispersed, and the resource in the first time slot can be obtained based on the first frequency domain position transmitted by the base station. The resources in other time slots of the plurality of consecutive time slots can be obtained based on the second frequency domain position determined based on the frequency domain position resource strategy and the first frequency domain position. Since the subband fading on the entire bandwidth is inconsistent and instead of unchanged, the channel condition is changed dynamically, the frequency domain positions of the resources in different time slots are different, so that the PDSCH will not experience channel fading in the same conditions in the frequency domain. Even if the frequency domain positions of the resources in some time slots are on the narrowband with the worst fading condition, the terminal can also resolve the data according to the PDSCH resources in other time slots. Since the data transmitted in each time slot in the plurality of consecutive time slots is the same, the terminal can obtain the data transmitted by the base station as long as the PDSCH of one time slot is successfully demodulated by the terminal, thereby improving the probability of successfully demodulating the PDSCH by the terminal in a non-ideal channel environment.

It can be known from above descriptions that the resource allocation method provided in this application can determine a second frequency domain position of a resource in a second time slot after the first time slot according to a first frequency domain position and a preset frequency domain position offset strategy after obtaining the first frequency domain position of a resource in a first time slot transmitted by a base station, so as to determine PDSCH resources allocated by the base station according to the frequency domain position of a resource in each time slot. Since the PDSCH resources are dispersed over the frequency domain positions in the plurality of consecutive time slots, the channel gain of PDSCH is increased, and PDSCH is prevented from being experienced channel fading in the same conditions in the frequency domain, thereby and improving the rate of success in demodulating the PDSCH by a terminal in a non-ideal channel environment.

According to the methods described in above embodiments, this embodiment will be further described from the perspective of a resource allocation device, and the resource allocation device may be integrated in a terminal. The terminal may include a cell phone, a tablet computer, and etc.

Referring to FIG. 9, this figure illustrates a resource allocation device provided in an embodiment of the present application. The resource allocation device may include an obtaining module 901, a frequency domain position determining module 902, and an allocated resource determining module 903.

(1) Obtaining Module 901

The obtaining module 901 is configured for obtaining a first frequency domain position of a resource in a first time slot transmitted by a base station, wherein the first time slot is a time slot among a plurality of aggregated consecutive time slots.

In an embodiment of the present invention, the plurality of consecutive time slots may be 2, 4 or 8 consecutive time slots. In the plurality of aggregated consecutive time slots, the size of resource block (RB) resources of PDSCH does not change, that is, the size of resources in each time slot is the same, and the time domain position of RB resources of PDSCH is the same. The time domain resources can be specified by a field of time domain resource assignment of DCI 1_0 or DCI 1_1 in the PDCCH channel, but the frequency domain position of RB resources of PDSCH is different in the plurality of consecutive time slots.

The first time slot may be the first one among the plurality of consecutive time slots, and the first frequency domain position may be a frequency domain start position of the resource in the first time slot, which is represented by $RB_{Start\text{-}first}$. The first frequency domain position can be specified by a field of frequency domain resource assignment of DCI 1_0 or DCI 1_1 in the PDCCH channel.

After determining the first frequency domain position of the resource in the first time slot, the base station only needs to transmit the first frequency domain position to the terminal via PDCCH.

(2) Frequency Domain Position Determining Module 902

The frequency domain position determining module 902 is configured for determining a second frequency domain position of a resource in a second time slot after the first time slot according to the first frequency domain position and a preset frequency domain position offset strategy.

In an embodiment of the present application, the second time slot may be any time slot located after the first time slot in the plurality of consecutive time slots, and the second frequency domain position may be the frequency domain start position of the resource in the second time slot. Since the size of resources in each time slot is fixed, the overall frequency domain position of the resource in the second time slot can be determined according to the frequency domain start position of the resource in the second time slot and the fixed size of resources.

The terminal is pre-configured with the same frequency domain position offset strategy as the base station. Since the resource allocation of the second time slot in the base station is based on the first frequency domain position and the frequency domain position offset strategy, the terminal can adopt the frequency domain position offset strategy after obtaining the first frequency domain position, to obtain the second frequency domain position of the resource in the second time slot.

The frequency domain position offset strategy may include a frequency domain position offset and a frequency domain position offset direction based on the first frequency domain position, that is, according to the ordering of the second time slot in the plurality of consecutive time slots, corresponding frequency domain position offset and frequency domain position offset direction can be determined to determine the second frequency domain position.

(3) Allocated Resource Determining Module 903

The allocated resource determining module 903 is configured for determining physical downlink shared channel (PDSCH) resources allocated by the base station according to the frequency domain position of a resource in each time slot among the plurality of consecutive time slots.

In the embodiment of the present application, the frequency domain positions of resources in different time slots are dispersed, and the resource in the first time slot can be obtained based on the first frequency domain position transmitted by the base station. The resources in other time slots of the plurality of consecutive time slots can be obtained based on the second frequency domain position determined based on the frequency domain position resource strategy and the first frequency domain position. Since the subband fading on the entire bandwidth is inconsistent and instead of unchanged, the channel condition is changed dynamically, the frequency domain positions of the resources in different time slots are different, so that the PDSCH will not experience channel fading in the same conditions in the frequency domain. Even if the frequency domain positions of the resources in some time slots are on the narrowband with the worst fading condition, the terminal can also resolve the data according to the PDSCH resources in other time slots. Since the data transmitted in each time slot in the plurality of consecutive time slots is the same, the terminal can obtain the data transmitted by the base station as long as the PDSCH of one time slot is successfully demodulated by the terminal, thereby improving the probability of successfully demodulating the PDSCH by the terminal in a non-ideal channel environment.

It can be known from above descriptions that the resource allocation device provided in this application can determine a second frequency domain position of a resource in a second time slot after the first time slot according to a first frequency domain position and a preset frequency domain position offset strategy after obtaining the first frequency domain position of a resource in a first time slot transmitted by a base station, so as to determine PDSCH resources allocated by the base station according to the frequency domain position of a resource in each time slot. Since the PDSCH resources are dispersed over the frequency domain positions in the plurality of consecutive time slots, the channel gain of PDSCH is increased, and PDSCH is prevented from being experienced channel fading in the same conditions in the frequency domain, thereby and improving the rate of success in demodulating the PDSCH by a terminal in a non-ideal channel environment.

Figure 10:
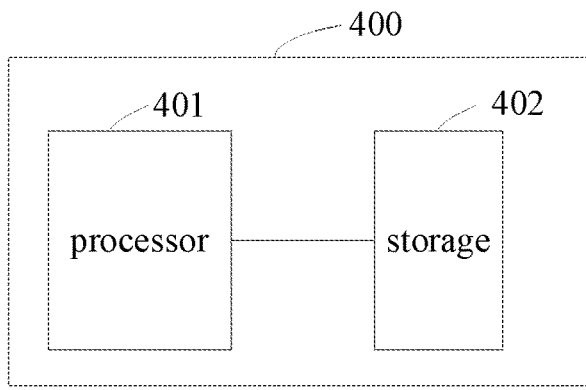
FIG. 10 is a structural schematic diagram showing a terminal provided in an embodiment of the present invention.

In addition, an embodiment of the present application also provides a terminal. The terminal may be a device such as a smartphone or an intelligent vehicle. As shown in FIG. 10, the terminal 400 includes a processor 401 and a storage 402. The processor 401 and the storage 402 are electrically connected to each other.

The processor 401 functions as a control center of the terminal 400 and is configured to connect each component of the mobile terminal using various interfaces and circuits, and is configured to execute or load application programs stored in the storage 402, to call the data stored in the storage 402 and to execute various functions of the mobile terminal and perform data processing, thereby monitoring the overall mobile terminal.

In the present embodiment, the processor 401 of the terminal 400 will load the instructions corresponding to a process of one or more than one application programs into the storage 402 based on the following steps, and the processor 401 will execute the application program stored in the storage 402 to realize various functions:

obtaining a first frequency domain position of a resource in a first time slot transmitted by a base station, wherein the first time slot is a time slot among a plurality of aggregated consecutive time slots;

determining a second frequency domain position of a resource in a second time slot after the first time slot according to the first frequency domain position and a preset frequency domain position offset strategy; and determining physical downlink shared channel (PDSCH) resources allocated by the base station according to the frequency domain position of a resource in each time slot among the plurality of consecutive time slots.

Figure 11:
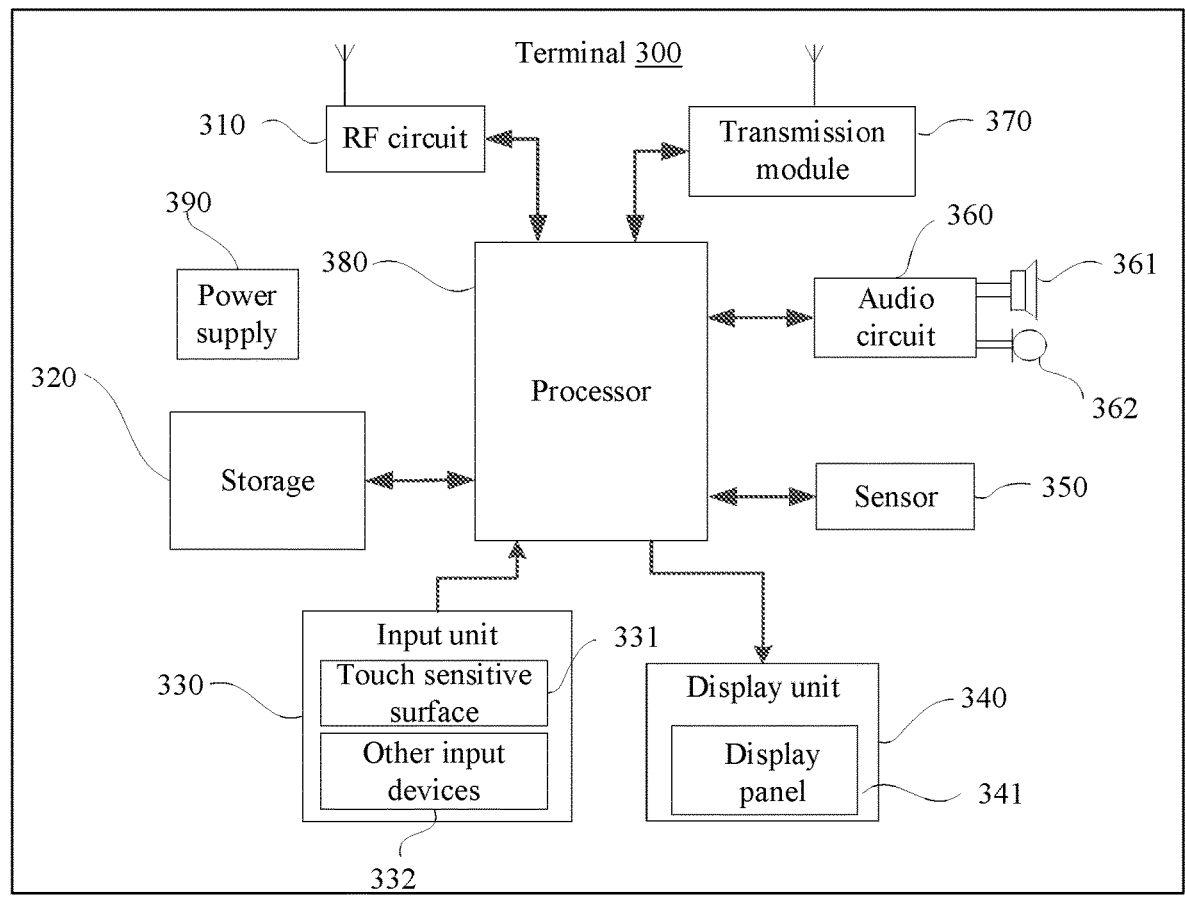
FIG. 11 is another structural schematic diagram showing a terminal provided in an embodiment of the present invention.

Refer to FIG. 11, which is a structural schematic diagram illustrating a terminal provided in an embodiment of the present application. The terminal 300 may include a radio frequency (RF) circuit 310, a storage 320 including one or more than one computer-readable storage medium, an input unit 330, a display unit 340, a sensor 350, an audio circuit 360, a speaker 361, a microphone 362, and a transmission module 370, a processor 380 including one or more processing cores, a power supply 390 and other components. A person skilled in the art understands that the structure of the terminal shown in FIG. 11 does not constitute a limitation to the terminal, and may include more or less components than those illustrated in the drawings. Furthermore, some components of the terminal can be combined and/or arranged in different ways other than that shown in FIG. 11.

The RF circuit 310 is configured to receive and transmit electromagnetic waves to implement conversion between the electromagnetic waves and electrical signals, thereby communicating with a communication network or any other device. The RF circuit 310 may include various existing circuit components for executing the functions, for example, an antenna, a cellular communication RF transceiver, a millimeter wave RF transceiver, a WIFI/BT transceiver, a GPS transceiver, a digital signal processor, an encryption/decryption chip, a subscriber identity module (SIM) card, a storage, and so on. The RF circuit 310 can communicate with various networks, such as internet, an intranet, or a wireless network, or can communicate with other devices via the wireless network. The above-mentioned wireless network may include a cellular network or a wireless local area network or metropolitan area network. The above-mentioned wireless network may use any one of communication standards, protocols, or technologies, including but not limited to Global System for Mobile communications (GSM), Enhanced Data GSM Environment (EDGE), Wideband Code Division Multiple Access (WCDMA), Code Division Multiple Access (CDMA), Time Division Multiple Access (TDMA), WIFI (such as standards of the Institute of Electrical and Electronics Engineers including IEEE802.11a, IEEE802.11b, IEEE 802.11g, and/or IEEE 802.11n), Voice over Internet Protocol (VoIP), Worldwide Interoperability for Microwave Access (Wi-Max), any other protocol for mails, instant communication, and short messages, any other suitable communication protocol, or any other protocol which has not been developed.

The storage 320 can be configured to store software programs and modules, such as the program instructions/modules corresponding to the voice communication network switching device and method in above-mentioned embodiments. The processor 380 can perform various applications of functions and data processing by executing the software programs and modules stored in the storage 320 to implement the mobile terminal control function. The storage 320 may include high-speed random access memory, and may further include non-volatile memory such as one or more disk storage devices, a flash memory, or other non-volatile solid state storage. In some embodiments, the storage 320 also includes a remote storage disposed corresponding to the processor 380. The remote storage may be linked to the terminal 300 via a network. The network may include but not limited to at least one combination of internet, an intranet, a local area network, and a mobile communication network.

The input unit 330 can be configured to receive input numbers or character information, and generate signal input of a keyboard, a mouse, a joystick, or an optical trackball in relation to user settings and functional control. Specifically, the input unit 330 may include a touch sensitive surface 331 and any other input device 332. The touch sensitive surface 331, which is also called a touch screen or a touchpad, can gather a touch operation (for example, operations by use of a finger of a user, a stylus, and any other suitable object or attachment on or near the sensitive surface 331) applied on or near to the touch sensitive surface 331 by the user and drive a connected device according to preset programs. Optionally, the touch sensitive surface 331 may include a touch-sensitive device and a touch controller. The touch-sensitive device detects a direction of the user's touch, detects signals resulted from the touch operation, and transmits the signals to the touch controller. The touch controller receives information of the touch from the touch-sensitive device, converts it into a touch coordinate, further transmits the coordinate to the processor 380, and further receives and executes an instruction from the processor 380. Furthermore, the touch sensitive surface 331 may be implemented by utilizing capacitive, resistive, infrared, and surface acoustic wave technologies. In addition to the touch sensitive surface 331, the input unit 330 may further include any other input device 332. Specifically, the input device 332 may include but not limited to one or any of the combination of a physical keyboard, function keys (such as volume control keys, switch keys, etc.), a trackball, a mouse, and a joystick.

The display unit 340 may be configured to display information inputted by the user, information provided for the user, or various types of graphical user interfaces of the terminal 300. The graphical user interfaces may include a graph, a text, an icon, a video, and any combination of them. The display unit 340 may include a display panel 341, optionally, which may be a liquid crystal display (LCD) or an Organic Light-Emitting Diode (OLED) display. Furthermore, the touch sensitive surface 331 may cover the display panel 341. When the touch sensitive surface 331 detects a touch operation on or near the touch sensitive surface 331 and transmits a corresponding signal to the processor 380 to determine a type of the touch event, the processor 380 controls the display panel 341 to provide appropriate visual output according to the type of the touch event. Although the touch sensitive surface 331 and the display panel 341 in FIG. 11 are two separate components for implementing input and output functions, the touch sensitive surface 331 and the display panel 341 may be integrated into one component for implementing the input and output functions in some embodiments.

The terminal 300 may further include at least one sensor 350, such as a light sensor, a motion sensor, and other sensors. Specifically, the light sensor can include an ambient light sensor and a proximity sensor. The ambient light sensor can adjust the brightness of the display panel 341 according to bright or dark as to the ambient light. The proximity sensor can turn off the display panel 341 and/or the backlight when the terminal 300 is moved close to ears. As one type of the motion sensor, a gravity sensor (G-sensor) can detect acceleration speed on all directions (generally up to three axis), can detect magnitude and direction of the gravity when it stays still, and can identify a gesture in a terminal application (such as a screen switch between landscape style and portrait style, relevant games, and magnetometer calibration) and recognize vibration patterns to identify relevant functions (such as pedometer, and knock), and so on. Additionally, a gyroscope, a barometer, a hygrometer, a thermometer, an infrared sensor, and any other sensor can be deployed in the terminal 300, and the details for these are not repeated herein.

The audio circuit 360, the speaker 361 and the microphone 162 can provide an audio interface between the user and the terminal 300. The audio circuit 360 converts received audio data to an electrical signal and transmits the electrical signal to the speaker 361. The speaker 361 converts the electrical signal to sound signals and outputs the sound signals. In addition, the microphone 362 converts collected sound signal to an electrical signal. The audio circuit 360 converts the electrical signal to audio data and transmits the audio data to the processor 380 for further processing. After the processing, the audio data may be transmitted to another terminal via the RF circuit 310, or transmitted to the storage 320 for further processing. The audio circuit 360 may further include an earphone jack for providing communication between an external earphone and the terminal 300.

The terminal 300 can be configured to, by the transmission module 370 (such as a WIFI module), send and receive emails, browse a webpage, and access to streaming media, and so on. It provides the user with wireless broadband internet access. It should be understood that although the transmission module 370 is illustrated in FIG. 11, this module is not an essential component for the terminal 300 and can be omitted according to needs without departing from the scope of the present invention.

The processor 380 functions as a control center of the terminal 300 and is configured to connect each component of the whole terminal using various interfaces and circuits, and is configured to execute the various functions of the terminal 300 and to perform data processing by running or executing the software programs and/or modules stored in the storage 320 and calling the data stored in the storage 320, thereby realizing overall monitoring over the terminal. Optionally, the processor 380 can include one or more processing cores. In some embodiments, an application processor and a modulation/demodulation processor can be integrated to form the processor 380. The application processor is primarily configured to process an operating system, user interfaces, application programs, and so on. The modulation/demodulation processor is primarily configured to process wireless communication. It should be understood that the modulation/demodulation processor can be independent from the processor 380.

The terminal 300 further includes the power supply 390 (such as a battery) configured to provide power for the various components of the terminal device 300. In some embodiments, the power supply can be logically coupled to the processor 380 via a power management system that controls charging, discharging, power consumption, and so on. The power supply 390 may further include one or more direct current (DC)/or alternating current (AC) power sources, recharging system, power failure detection circuit, power converter or inverter, power supply status indicator, and the like.

Although not being shown, the terminal 300 may include a camera (such as a front camera and a rear camera), a BLUETOOTH module, and so on. They are not repeated herein. In the present embodiment, a display unit of the mobile terminal is a touch screen display. The mobile terminal further includes a storage and one or more programs. The one or more programs are stored in the storage. After configuration, one or more processors execute the one or more programs, which include the following operating instructions:

obtaining a first frequency domain position of a resource in a first time slot transmitted by a base station, wherein the first time slot is a time slot among a plurality of aggregated consecutive time slots;

determining a second frequency domain position of a resource in a second time slot after the first time slot according to the first frequency domain position and a preset frequency domain position offset strategy; and determining physical downlink shared channel (PDSCH) resources allocated by the base station according to the frequency domain position of a resource in each time slot among the plurality of consecutive time slots.

During specific implementation, the foregoing modules may be implemented as independent entities, or may be implemented as one or more entities through random combination. For specific implementation of the foregoing modules, refer to the above method embodiments, and details are not described herein again.

A person of ordinary skill in the art may understand that all or some of the steps in various methods of the foregoing embodiments may be implemented by program instructions, or may be implemented by a program instructing relevant hardware. The program instructions may be stored in a computer readable storage medium, and be loaded and executed by a processor. For this, an embodiment of the present embodiment provides a storage medium, which stores a plurality of instructions that can be loaded by the processor to execute the steps of any of the voice communication network switching methods provided in the embodiments of the present application.

The storage medium may include a read only memory (ROM), a random access memory (RAM), a magnetic disk or an optic disc.

Since the program instructions stored in the storage medium can execute the steps of any of the resource allocation methods provided in the embodiments of the present invention, it can realize the beneficial effects achieved by any of the resource allocation methods provided in the embodiments of the present invention, which are referred to above embodiments and are not repeated herein.

Implementation of above operations may refer to above embodiments, and is not repeated herein.

While the preferred embodiments of the present application have been illustrated and described in detail, various modifications and alterations can be made by persons skilled in this art. The embodiment of the present application is therefore described in an illustrative but not restrictive sense. It is intended that the present application should not be limited to the particular forms as illustrated, and that all modifications and alterations which maintain the spirit and realm of the present application are within the scope as defined in the appended claims.

The invention claimed is:

1. A resource allocation method, comprising:

determining a first frequency domain position of a resource in a first time slot among a plurality of aggregated consecutive time slots;

determining a second frequency domain position of a resource in a second time slot after the first time slot according to the first frequency domain position and a preset frequency domain position offset strategy; and allocating physical downlink shared channel (PDSCH) resources to a terminal according to the frequency domain position of a resource in each time slot among the plurality of consecutive time slots;

wherein the present frequency domain position offset strategy comprises a frequency domain position offset and a frequency domain position offset direction; the frequency domain position offset is calculated according to the following formula:

$$(-1)^{(Slot_i \bmod 2)} \cdot \left\lfloor \frac{N_{BWP}^{size}}{n} \right\rfloor \quad Slot_i - Slot_{first} \leq 2;$$

$$(-1)^{(Slot_i \bmod 2)} \cdot \left\lfloor \frac{N_{BWP}^{size}}{n} \right\rfloor \cdot 2 \quad Slot_i - Slot_{first} \leq 4;$$

$$(-1)^{(Slot_i \bmod 2)} \cdot \left\lfloor \frac{N_{BWP}^{size}}{n} \right\rfloor \cdot 3 \quad Slot_i - Slot_{first} \leq 6;$$

$$(-1)^{(Slot_i \bmod 2)} \cdot \left\lfloor \frac{N_{BWP}^{size}}{n} \right\rfloor \cdot 4 \quad Slot_i - Slot_{first} \leq 7;$$

where $Slot_{first}$ is an ID of the first time slot in the plurality of consecutive time slots, $Slot_i$ is the ID of an i-th time slot in the plurality of consecutive time slots, $N_{BWP}^{size}/n$ is a preset offset, and n is a number of consecutive time slots.

2. The resource allocation method according to claim 1, wherein the determining the second frequency domain position of the resource in the second time slot after the first time slot according to the first frequency domain position and the preset frequency domain position offset strategy comprises:

determining the number of time slots between the second time slot and the first time slot;

determining the frequency domain position offset of the resource in the second time slot with respect to the resource in the first time slot according to the number of time slots;

determining the second frequency domain position of the resource in the second time slot according to the first frequency domain position and the frequency domain position offset.

3. The resource allocation method according to claim 2, wherein the determining the frequency domain position offset of the resource in the second time slot with respect to the resource in the first time slot according to the number of time slots comprises:

determining the frequency domain position offset of the resource in the second time slot with respect to the resource in the first time slot as one preset offset if the number of time slots is 0 or 1;

determining the frequency domain position offset of the resource in the second time slot with respect to the resource in the first time slot as two preset offsets if the number of time slots is 2 or 3;

determining the frequency domain position offset of the resource in the second time slot with respect to the resource in the first time slot as three preset offsets if the number of time slots is 4 or 5;

determining the frequency domain position offset of the resource in the second time slot with respect to the resource in the first time slot as four preset offsets if the number of time slots is 6.

4. The resource allocation method according to claim 2, wherein the determining the second frequency domain position of the resource in the second time slot according to the first frequency domain position and the frequency domain position offset comprises:

detecting whether the number of time slots is even or odd;

determining the frequency domain position offset direction as a negative direction if the number of time slots is an even number, and offsetting by the frequency domain position offset based on the first frequency domain position along the negative direction to obtain the second frequency domain position of the resource in the second time slot;

determining the frequency domain position offset direction as a positive direction if the number of time slots is an odd number, and offsetting by the frequency domain position offset based on the first frequency domain position along the positive direction to obtain the second frequency domain position of the resource in the second time slot.

5. The resource allocation method according to claim 1, wherein the second frequency domain position is a frequency domain start position of the resource in the second time slot;

the method further comprises:

allocating partial resources between the second frequency domain position and bandwidth boundary and allocating remaining resources in remaining bandwidth if a length of resources in frequency domain exceeds a length between the second frequency domain position and the bandwidth boundary, when allocating resources in the second time slot.

6. The resource allocation method according to claim 1, further comprising:

transmitting the first frequency domain position of the resource in the first time slot to the terminal via physical downlink control channel (PDCCH).

7. A non-transitory computer readable storage medium, wherein the storage medium stores a plurality of instructions applicable to be loaded by a processor to execute the following steps:

determining a first frequency domain position of a resource in a first time slot among a plurality of aggregated consecutive time slots;

determining a second frequency domain position of a resource in a second time slot after the first time slot according to the first frequency domain position and a preset frequency domain position offset strategy; and allocating physical downlink shared channel (PDSCH) resources to a terminal according to the frequency domain position of a resource in each time slot among the plurality of consecutive time slots;

wherein the present frequency domain position offset strategy comprises a frequency domain position offset and a frequency domain position offset direction; the frequency domain position offset is calculated according to the following formula:

28

$$(-1)^{(Slot_i \bmod 2)} \cdot \left\lceil \frac{N_{BWP}^{size}}{n} \right\rceil \quad Slot_i - Slot_{first} \le 2;$$

$$(-1)^{(Slot_i \bmod 2)} \cdot \left\lceil \frac{N_{BWP}^{size}}{n} \right\rceil \cdot 2 \quad Slot_i - Slot_{first} \le 4;$$

$$(-1)^{(Slot_i \bmod 2)} \cdot \left\lceil \frac{N_{BWP}^{size}}{n} \right\rceil \cdot 3 \quad Slot_i - Slot_{first} \le 6;$$

$$(-1)^{(Slot_i \bmod 2)} \cdot \left\lceil \frac{N_{BWP}^{size}}{n} \right\rceil \cdot 4 \quad Slot_i - Slot_{first} \le 7;$$

where $Slot_{first}$ is an ID of the first time slot in the plurality of consecutive time slots, $Slot_i$ is the ID of an i-th time slot in the plurality of consecutive time slots, $N_{BWP}^{size}/n$ is a preset offset, and n is a number of consecutive time slots.

8. The non-transitory computer readable storage medium according to claim 7, wherein when executing the determining the second frequency domain position of the resource in the second time slot after the first time slot according to the first frequency domain position and the preset frequency domain position offset strategy, the processor executes the following steps:

determining the number of time slots between the second time slot and the first time slot;

determining the frequency domain position offset of the resource in the second time slot with respect to the resource in the first time slot according to the number of time slots;

determining the second frequency domain position of the resource in the second time slot according to the first frequency domain position and the frequency domain position offset.

9. The non-transitory computer readable storage medium according to claim 8, wherein when executing the determining the frequency domain position offset of the resource in the second time slot with respect to the resource in the first time slot according to the number of time slots, the processor executes the following steps:

determining the frequency domain position offset of the resource in the second time slot with respect to the resource in the first time slot as one preset offset if the number of time slots is 0 or 1;

determining the frequency domain position offset of the resource in the second time slot with respect to the resource in the first time slot as two preset offsets if the number of time slots is 2 or 3;

determining the frequency domain position offset of the resource in the second time slot with respect to the resource in the first time slot as three preset offsets if the number of time slots is 4 or 5;

determining the frequency domain position offset of the resource in the second time slot with respect to the resource in the first time slot as four preset offsets if the number of time slots is 6.

10. The non-transitory computer readable storage medium according to claim 8, wherein when executing the determining the second frequency domain position of the resource in the second time slot according to the first frequency domain position and the frequency domain position offset, the processor executes the following steps:

detecting whether the number of time slots is even or odd;

determining the frequency domain position offset direction as a negative direction if the number of time slots is an even number, and offsetting by the frequency domain position offset based on the first frequency domain position along the negative direction to obtain the second frequency domain position of the resource in the second time slot;

determining the frequency domain position offset direction as a positive direction if the number of time slots is an odd number, and offsetting by the frequency domain position offset based on the first frequency domain position along the positive direction to obtain the second frequency domain position of the resource in the second time slot.

11. The non-transitory computer readable storage medium according to claim 7, wherein the second frequency domain position is a frequency domain start position of the resource in the second time slot;

the processor further executes the following step:

allocating partial resources between the second frequency domain position and bandwidth boundary and allocating remaining resources in remaining bandwidth if a length of resources in frequency domain exceeds a length between the second frequency domain position and the bandwidth boundary, when allocating resources in the second time slot.

12. The non-transitory computer readable storage medium according to claim 7, wherein the processor further executes the following step:

transmitting the first frequency domain position of the resource in the first time slot to the terminal via physical downlink control channel (PDCCH).

13. A terminal, comprising a processor and a storage that are electrically connected to each other, wherein the storage is configured to store instructions and data, and the processor is configured to execute the following steps:

determining a first frequency domain position of a resource in a first time slot among a plurality of aggregated consecutive time slots;

determining a second frequency domain position of a resource in a second time slot after the first time slot according to the first frequency domain position and a preset frequency domain position offset strategy; and allocating physical downlink shared channel (PDSCH) resources to a terminal according to the frequency domain position of a resource in each time slot among the plurality of consecutive time slots;

wherein the present frequency domain position offset strategy comprises a frequency domain position offset and a frequency domain position offset direction; the frequency domain position offset is calculated according to the following formula:

$$(-1)^{(Slot_i \bmod 2)} \cdot \left\lfloor \frac{N_{BWP}^{size}}{n} \right\rfloor \quad Slot_i - Slot_{first} \leq 2;$$

$$(-1)^{(Slot_i \bmod 2)} \cdot \left\lfloor \frac{N_{BWP}^{size}}{n} \right\rfloor \cdot 2 \quad Slot_i - Slot_{first} \leq 4;$$

$$(-1)^{(Slot_i \bmod 2)} \cdot \left\lfloor \frac{N_{BWP}^{size}}{n} \right\rfloor \cdot 3 \quad Slot_i - Slot_{first} \leq 6;$$

$$(-1)^{(Slot_i \bmod 2)} \cdot \left\lfloor \frac{N_{BWP}^{size}}{n} \right\rfloor \cdot 4 \quad Slot_i - Slot_{first} \leq 7;$$

where $Slot_{first}$ is an ID of the first time slot in the plurality of consecutive time slots, $Slot_i$ is the ID of an i-th time slot in the plurality of consecutive time slots, $N_{BWP}^{size}/n$ is a preset offset, and n is a number of consecutive time slots.

14. The terminal according to claim 13, wherein when executing the determining the second frequency domain position of the resource in the second time slot after the first time slot according to the first frequency domain position and the preset frequency domain position offset strategy, the processor executes the following steps:

determining the number of time slots between the second time slot and the first time slot;

determining the frequency domain position offset of the resource in the second time slot with respect to the resource in the first time slot according to the number of time slots;

determining the second frequency domain position of the resource in the second time slot according to the first frequency domain position and the frequency domain position offset.

15. The terminal according to claim 14, wherein when executing the determining the frequency domain position offset of the resource in the second time slot with respect to the resource in the first time slot according to the number of time slots, the processor executes the following steps:

determining the frequency domain position offset of the resource in the second time slot with respect to the resource in the first time slot as one preset offset if the number of time slots is 0 or 1;

determining the frequency domain position offset of the resource in the second time slot with respect to the resource in the first time slot as two preset offsets if the number of time slots is 2 or 3;

determining the frequency domain position offset of the resource in the second time slot with respect to the resource in the first time slot as three preset offsets if the number of time slots is 4 or 5;

determining the frequency domain position offset of the resource in the second time slot with respect to the resource in the first time slot as four preset offsets if the number of time slots is 6.

16. The terminal according to claim 14, wherein when executing the determining the second frequency domain position of the resource in the second time slot according to the first frequency domain position and the frequency domain position offset, the processor executes the following steps:

detecting whether the number of time slots is even or odd;

determining the frequency domain position offset direction as a negative direction if the number of time slots is an even number, and offsetting by the frequency domain position offset based on the first frequency domain position along the negative direction to obtain the second frequency domain position of the resource in the second time slot;

determining the frequency domain position offset direction as a positive direction if the number of time slots is an odd number, and offsetting by the frequency domain position offset based on the first frequency domain position along the positive direction to obtain the second frequency domain position of the resource in the second time slot.

17. The terminal according to claim 13, wherein the second frequency domain position is a frequency domain start position of the resource in the second time slot;

the processor further executes the following step:

allocating partial resources between the second frequency domain position and bandwidth boundary and allocating remaining resources in remaining bandwidth if a length of resources in frequency domain exceeds a length between the second frequency domain position and the bandwidth boundary, when allocating resources in the second time slot.

18. The terminal according to claim 13, wherein the processor further executes the following step:

transmitting the first frequency domain position of the resource in the first time slot to the terminal via physical downlink control channel (PDCCH).

\* \* \* \* \*